(12) United States Patent
Villalon, Jr.

(10) Patent No.: US 11,248,278 B1
(45) Date of Patent: Feb. 15, 2022

(54) METAL RECOVERY USING MOLTEN SALT AND RELATED SYSTEMS

(71) Applicant: Phoenix Tailings, Inc., Woburn, MA (US)

(72) Inventor: Thomas Anthony Villalon, Jr., Cambridge, MA (US)

(73) Assignee: Phoenix Tailings, Inc., Woburn, MA (US)

( * ) Notice: Subject to any disclaimer, the term of this patent is extended or adjusted under 35 U.S.C. 154(b) by 0 days.

(21) Appl. No.: 17/170,678

(22) Filed: Feb. 8, 2021

Related U.S. Application Data

(60) Provisional application No. 63/124,618, filed on Dec. 11, 2020.

(51) Int. Cl.
*C22B 11/06* (2006.01)
*C22B 3/22* (2006.01)

(52) U.S. Cl.
CPC ............... *C22B 11/06* (2013.01); *C22B 3/22* (2013.01)

(58) Field of Classification Search
CPC ................................. C22B 11/06; C22B 3/22
USPC ....................................................... 423/179
See application file for complete search history.

(56) References Cited

U.S. PATENT DOCUMENTS

| | | | | | |
|---|---|---|---|---|---|
| 3,899,322 | A | * | 8/1975 | Yosim ..................... | C22B 7/001 75/402 |
| 4,209,501 | A | * | 6/1980 | Kruesi ...................... | C01B 9/02 423/46 |
| 5,074,910 | A | * | 12/1991 | Dubrovsky ............. | C22B 11/06 75/637 |
| 5,104,445 | A | * | 4/1992 | Dubrovsky ............... | C22B 1/08 75/585 |
| 9,150,973 | B2 | * | 10/2015 | Teng ......................... | C25B 1/00 |

FOREIGN PATENT DOCUMENTS

WO   WO 2014/091456 A1   6/2014

OTHER PUBLICATIONS

Horike, et al. "Effective Dissolution of Platinum by Using Chloride Salts in Recovery Process," *Metallurgical and Materials Transactions B*, vol. 43B, Dec. 2012. pp 1300-1307.
Nikoloski, A. N. et al., "Recovery of platinum, palladium and rhodium from acidic chloride leach solution using ion exchange resins," *Hydrometallurgy*, vol. 152, Dec. 18, 2014. pp. 20-32.
Tatarnikov, A. V. et al., "Treatment of Platinum Flotation Products," *Platinum Metals Rev.*, 2004, 48, (3), pp. 125-132.
Yoshimura, A. et al., "A Fundamental Study of Platinum Recovery from Spent Auto-Catalyst, Using 'Dry Aqua Regia'," *J. Japan Inst. Met. Mater.* vol. 83, No. 1. Nov. 30, 2018. pp. 23-29.

* cited by examiner

*Primary Examiner* — Melissa S Swain
(74) *Attorney, Agent, or Firm* — Wolf, Greenfield & Sacks, P.C.

(57) ABSTRACT

The present disclosure is related to the recovery of metal(s) using molten salt and related systems.

29 Claims, 7 Drawing Sheets

METAL RECOVERY USING MOLTEN SALT AND RELATED SYSTEMS

RELATED APPLICATIONS

This application claims priority under 35 U.S.C. § 119(e) to U.S. Provisional Patent Application No. 63/124,618, filed Dec. 11, 2020, and entitled "Metal Recovery Using Molten Salt and Related Systems," which is incorporated herein by reference in its entirety for all purposes.

TECHNICAL FIELD

Metal recovery using molten salt and related systems are generally described.

SUMMARY

The present disclosure is related to the recovery of metal(s) using molten salt. Related systems and products are also described. The subject matter of the present disclosure involves, in some cases, interrelated products, alternative solutions to a particular problem, and/or a plurality of different uses of one or more systems and/or articles.

Certain aspects are related to methods. In some embodiments, the method comprises heating a solid salt material comprising an alkali metal and/or an alkaline earth metal, a Lewis acid that is not an alkali metal and is not an alkaline earth metal, and a halogen such that at least a portion of the solid salt material melts to form a molten salt material comprising at least some of the alkali metal and/or alkaline earth metal, at least some of the Lewis acid that is not an alkali metal and is not an alkaline earth metal, and at least some of the halogen.

In certain embodiments, the method comprises adding a target-metal-containing material to a molten salt, such that at least a portion of a target metal in the target-metal-containing material is removed from the target-metal-containing material.

The method comprises, in some embodiments, exposing a target-metal-containing material to a fluid phase comprising a molten halogen salt such that at least a portion of a target metal in the target-metal-containing material is removed from the target-metal-containing material, wherein a ratio, within the fluid phase, of the number of halogen atoms within the molten halogen salt to the number of chlorine atoms from a supplemental source, if present, is at least 3:1.

Certain aspects are related to methods. In some embodiments, the method comprises exposing a target-metal-containing material to a fluid phase comprising a halogen salt comprising a Lewis acid that is not an alkali metal and is not an alkaline earth metal such that at least a portion of a target metal in the target-metal-containing material is removed from the target-metal-containing material, wherein at least 50 vol % of all halogen salts within the fluid phase that are halogen salts comprising a Lewis acid that is not an alkali metal and is not an alkaline earth metal are molten.

Certain aspects are related to a bath. In some embodiments, the bath comprises a fluid phase comprising a halogen salt comprising a Lewis acid that is not an alkali metal and is not an alkaline earth metal, wherein at least 50 vol % of all halogen salts within the fluid phase that are halogen salts comprising a Lewis acid that is not an alkali metal and is not an alkaline earth metal are molten.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Metal recovery using molten salt and related systems are generally described. Certain aspects of the present disclosure are directed to the discovery that the use of certain molten salts can allow for selective separation of at least one target metal from materials containing the target metal and one or more other materials (e.g., non-target-metal materials). Certain embodiments are related to the discovery that the use of a melt comprising an alkali metal and/or an alkaline earth metal, a Lewis acid that is not an alkali metal and is not an alkaline earth metal, and a halide can provide, in certain instances, one or more of a variety of operational advantages including, but not limited to, selective removal of target metal relative to non-target-metal materials such as oxides, lower operating temperature, reduced gas formation, and/or the ability to achieve a relatively high degree of melting. Some embodiments are related to the discovery that effective metal separation can be achieved even when little or no supplemental halogens (e.g., supplemental chlorine, supplemental bromine, or other supplemental halogens) are present within the system during separation. It has also been recognized, within the context of the present disclosure, that certain of the melt materials described herein can allow one to add target-metal-containing material to an already-formed bath of molten salt, which can have a number of advantageous effects including, in certain cases, enhanced process efficiency, continuous operation, reduced halogen volatility, and the like.

In some embodiments, methods are described. The methods can involve, in some embodiments, heating one or more solid salts such that the salt(s) is melted. In some embodiments, after the molten salt has been formed, one or more items containing at least one target metal material and at least one other material (e.g., a non-target-metal material) can be added to the molten salt(s). The molten salt(s) can, in certain embodiments, be used to remove at least one target metal from the item(s).

FIGS. 1A-1E are schematic illustrations of one such process that can be used to recover target metal from a target-metal-containing material. These figures are referred to throughout the disclosure below.

Figure 1A:
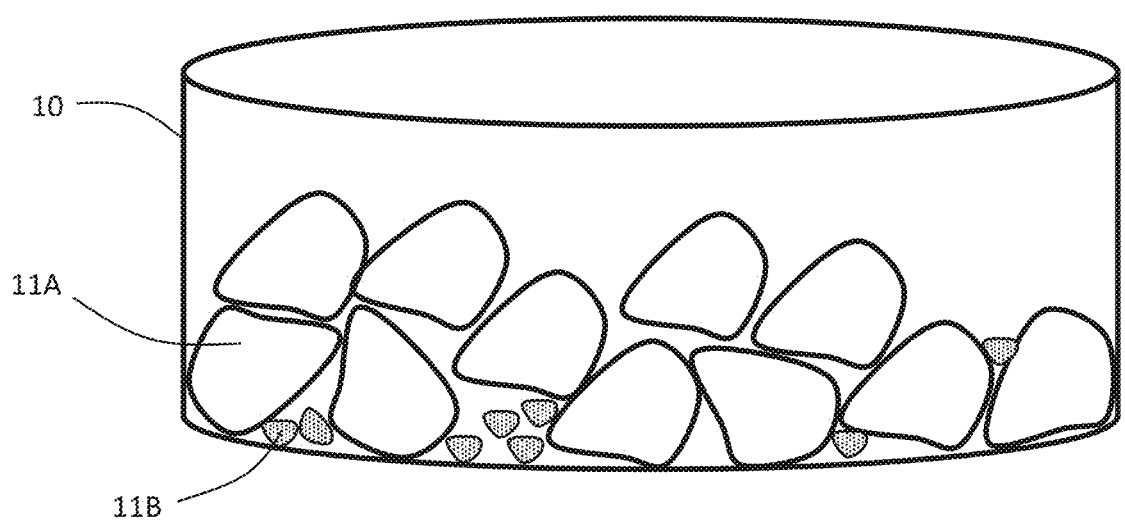
FIGS. 1A-1E are, in accordance with certain embodiments, perspective view schematic illustrations showing a method of recovering metal from a target-metal-containing material using molten salt.
Figure 1B:
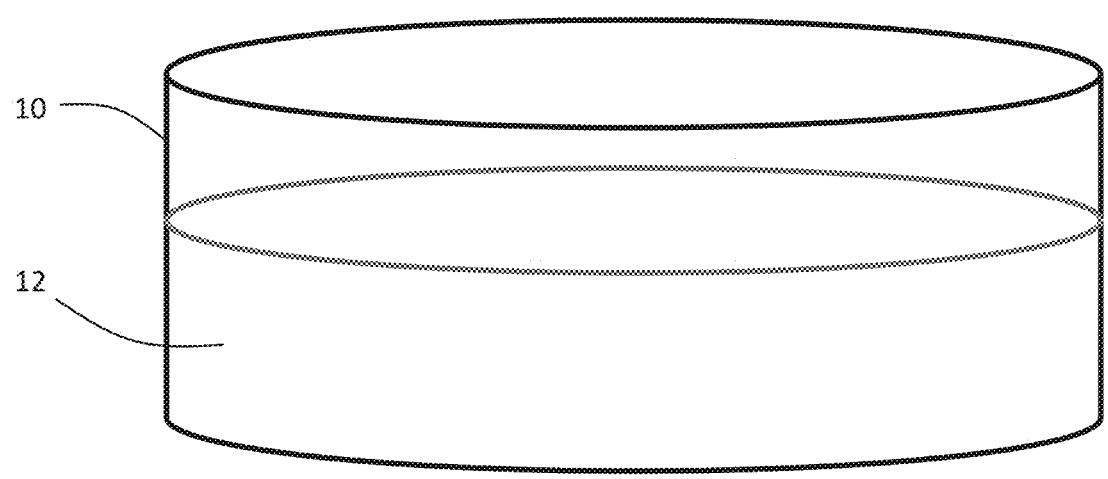

Certain embodiments comprise heating a solid salt material (e.g., a solid halogen salt) such that at least a portion of the solid salt melts and forms a molten salt. FIGS. 1A-1B illustrate the formation of a molten salt bath by melting molten salts within vessel 10 (e.g., a vat, a reactor, etc.). As shown in FIG. 1A, solid salt material 11 has been added to vessel 10. In FIG. 1B, the solid salts 11 from FIG. 1A have been heated to or above their melting point, causing the formation of a fluid phase 12 within vessel 10.

In some embodiments, the molten salt(s) comprises one or more halogen salts. A "halogen salt" is any salt that contains a halogen atom. For the purposes of the present disclosure, the "halogen" elements are fluorine (F), chlorine (Cl), bromine (Br), iodine (I), astatine (At), and tennessine (Ts). When halogen salt is employed, the solid salt that is heated can include a single halogen salt or a combination of multiple halogen salts. In accordance with certain embodiments, it can be advantageous to use particular combinations of halogen salts to achieve desired bath characteristics, enhanced processing efficiencies, and other advantages.

In some embodiments, the solid salt that is heated comprises an alkali metal and/or an alkaline earth metal. For ease of reference, in various places throughout this disclosure, the phrase "I-II Element" is used to refer to any element that is either an alkali metal or an alkaline earth metal. The term "alkali metal" is used herein to refer to the following six chemical elements of Group 1 of the periodic table: lithium (Li), sodium (Na), potassium (K), rubidium (Rb), cesium (Cs), and francium (Fr). The term "alkaline earth metal" is used herein to refer to the six chemical elements in Group 2 of the periodic table: beryllium (Be), magnesium (Mg), calcium (Ca), strontium (Sr), barium (Ba), and radium (Ra). A "Non-I-II Element" is an element that is not an alkali metal and is not an alkaline earth metal.

One way to introduce an alkali metal and/or an alkaline earth metal into the solid salt material is by using a halogen salt comprising an alkali metal and/or an alkaline earth metal. For ease of reference, in various places throughout this disclosure, the phrase "I-II Halogen Salt" is used to refer to a halogen salt comprising a I-II Element. A variety of solid I-II Halogen Salts can be used. In certain embodiments, it can be advantageous to use a solid I-II Halogen Salt that is a chloride or fluoride salt. In some embodiments, the I-II Halogen Salt comprises NaCl, KCl, $MgF_2$, and/or $CaBr_2$. In certain embodiments, a combination of NaCl and KCl is used as the solid I-II Halogen Salt.

In some embodiments, the solid salt that is heated comprises a Lewis acid that is not an alkali metal or an alkaline earth metal. For ease of reference, in various places throughout this disclosure, the phrase "Non-I-II Lewis Acid" is used to refer to any Lewis Acid that is not an alkali metal and is not an alkaline earth metal. (That is to say, a "Non-I-II Lewis Acid" is a Lewis acid that is not a I-II Element.) In some embodiments, the Non-I-II Lewis Acid can be an elemental Non-I-II Lewis Acid (i.e., a Non-I-II Lewis Acid element in cationic form). In some embodiments, the Non-I-II Lewis Acid can be a metal cation Non-I-II Element. In some embodiments, the Non-I-II Lewis Acid can be a metalloid cation Non-I-II Element.

One way to introduce a Lewis acid that is not an alkali metal or an alkali earth metal into the solid salt material is by using a halogen salt comprising a Lewis acid that is not an alkali metal or an alkaline earth metal. For ease of reference, in various places throughout this disclosure, the phrase "Non-I-II Lewis Acid Halogen Salt" is used to refer to a halogen salt comprising a Lewis acid that is not an alkali metal or an alkaline earth metal. A variety of Non-I-II Lewis Acid Halogen Salts can be used. In some embodiments, the Lewis acid that is not an alkali metal or an alkaline earth metal within the Non-I-II Lewis Acid Halogen Salt comprises or is a metal cation. The metal cation can have, for example, an oxidation state of greater than +1, such as an oxidation state of +2, +3, +4, +5, +6, or +7. In some embodiments, the Lewis acid that is not an alkali metal or an alkaline earth metal within the Non-I-II Lewis Acid Halogen Salt comprises or is a transition metal cation. The "transition metals," as used herein, are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn). Non-limiting examples of transition metal cations that can be used include $Ni^{+2}$, $Cu^{+2}$, $Fe^{+3}$ $Mn^{7+}$, and/or $Cr^{6+}$. In some embodiments, the Non-I-II Lewis Acid can be cationic tin (Sn). In certain embodiments, it can be advantageous to use a chloride or fluoride salt of a Lewis acid that is not an alkali metal or an alkaline earth metal. In some embodiments, the Non-I-II Lewis Acid Halogen Salt comprises $FeCl_3$, $CuCl_2$, $NiCl_2$, $CrF_4$, and/or $VI_3$. In certain embodiments, the use of $FeCl_3$ can be particularly advantageous.

In some embodiments, the solid salt that is heated comprises at least one alkali metal and/or at least one alkaline earth metal and at least one Lewis acid that is not an alkali metal or an alkaline earth metal. This can be achieved, for example, by using a single solid salt material comprising both a I-II Element and a Non-I-II Lewis Acid. For example, the solid salt could take the form $A_xD_yE_z$, where A is one or more I-II Element, D is one or more Non-I-II Lewis Acid, and E is one or more halogen. (A solid salt that contains a I-II Element, a Non-I-II Lewis Acid, and a halogen qualifies as both a I-II Halogen Salt and a Non-I-II Lewis Acid Halogen Salt.) Introducing at least one I-II Element and at least one Non-I-II Lewis Acid into the salt material can also be achieved by using a solid salt material containing a first solid salt comprising at least one I-II Element and a second solid salt comprising at least one Non-I-II Lewis Acid.

As noted above, certain embodiments comprise heating one or more solid halogen salts (e.g., a single solid halogen salt, or a combination of two or more solid halogen salts) such that at least a portion of the solid halogen salt(s) melts and forms a molten salt. Those of ordinary skill in the art would understand that a molten salt is a liquid-phase salt, as opposed to a solubilized salt (which refers to a salt that has been solubilized into its constituent ions within a solvent). In some embodiments, the molten salt is a salt that is in a solid phase when at a temperature of 25° C. and a pressure of 1 atmosphere but that melts to form a liquid phase when heated to or above its melting point.

In some embodiments, heating the one or more solid halogen salts comprises heating a combination of a first solid halogen salt (e.g., a solid I-II Halogen Salt) and a second solid halogen salt (e.g., a solid Non-I-II Lewis Acid Halogen Salt). For example, in FIG. 1A, vessel 10 contains a first solid salt 11A and a second solid salt 11B. Solid salt 11A can correspond to, for example, a solid I-II Halogen Salt, and solid salt 11B can correspond to, for example, a solid Non-I-II Lewis Acid Halogen Salt. While FIG. 1A shows the presence of two separate solid salt materials (11A and 11B), in other embodiments, a single solid salt material can be heated. In addition, while FIG. 1A shows the presence of both a solid I-II Halogen Salt and a distinct solid Non-I-II Lewis Acid Halogen Salt, in certain embodiments, the heating comprises heating a single solid salt material that comprises one or more I-II Elements, one or more Non-I-II Lewis Acids, and one or more halogens. For example, certain embodiments comprise heating a single solid salt that takes the form of $A_xD_yE_z$, where A is one or more I-II Elements, D is one or more Non-I-II Lewis Acids, and E is one or more halogens. Referring again to FIG. 1A, solid salt 11A can correspond to, for example, a single solid salt material that takes the form of $A_xD_yE_z$. In some such embodiments, solid salt 11B may not be present.

In some embodiments, the solid salt material that is heated comprises more than one solid I-II Halogen Salt and/or more than one Non-I-II Lewis Acid Halogen Salt. For instance, in one set of embodiments, the combination may comprise a first solid salt that is a I-II Halogen Salt (e.g., NaCl), a second solid salt that is a I-II Halogen Salt (e.g., KCl), and a third solid salt that is a Non-I-II Lewis Acid Halogen Salt (e.g., $FeCl_3$).

In one set of embodiments, the I-II Halogen Salt that is heated comprises NaCl and/or KCl, and the Non-I-II Lewis Acid Halogen Salt that is heated comprises $FeCl_3$. Additional halogen salts (e.g., a third solid halogen salt, a fourth solid halogen salt, a fifth solid halogen salt, etc.) may also be included. The additional solid halogen salts may be additional solid I-II Halogen Salt(s) and/or additional solid Non-I-II Lewis Acid Halogen Salt(s).

In certain embodiments, the solid salt material that is heated contains a relatively low amount of target metal. As used herein, "target metal" refers to metal that is (1) in a zero oxidation state or (2) is in a non-zero oxidation state form within a compound other than a halogen compound or an oxide compound. For example, metallic platinum would be considered a target metal because it is a metal in a zero oxidation state. The platinum within platinum chloride would not, on the other hand, be considered a target metal because the platinum in platinum chloride is in a halogen compound. Platinum oxide would also not be considered a target metal because the platinum within the platinum oxide is in an oxide compound. "Target-metal-containing materials" are materials that contain target metal. A variety of target-metal-containing materials can be processed according to various embodiments of the present disclosure to recover various target metals, as described in more detail below. In certain embodiments, it can be advantageous to use methods described herein to process materials in which the target metal(s) is present in a zero oxidation state, in the form of a sulfide, in the form of an arsenide, in the form of a carbonate, and/or in the form of a phosphate. In some embodiments, the target metal(s) may be present in an oxidation state of greater than or equal to +2 (e.g., greater than or equal to +3, greater than or equal to +4, greater than or equal to +5, or greater than or equal to +6). For example, target-metal-containing material(s) that contain non-zero oxidation state platinum as the target metal include, but are not limited to, platinum sulfide, platinum carbonate, platinum arsenide, and platinum phosphate.

It has been discovered, in the context of the present disclosure, that heating and melting the solid salt prior to introducing target-metal-containing material can provide a number of advantages, in certain cases, such as reduced volatilization of halogens, more efficient processing, lower operating temperatures, and/or reduced cost of production. In certain embodiments, the amount of target metal in the solid salt material that is heated, prior to melting the solid salt material, is less than 30 wt %, less than 20 wt %, less than 10 wt %, less than 5 wt %, less than 1 wt %, less than 0.1 wt %, or less.

In some embodiments, heating the one or more solid salts results in the at least partial melting of the solid salt(s). For example, some embodiments comprise heating a solid Non-I-II Lewis Acid Halogen Salt such that at least a portion of the Non-I-II Lewis Acid Halogen Salt melts. This can produce a fluid phase comprising molten salt that comprises at least one Non-I-II Lewis Acid.

Certain embodiments comprise heating a solid salt material to at least partially melt the salt material such that a molten salt comprising at least one I-II Element, at least one Non-I-II Lewis Acid, and at least one halogen is produced. In some embodiments, a single solid salt material that takes the form of $A_xD_yE_z$ can be heated such that at least a portion of the single solid salt melts to form a molten salt comprising at least one I-II Element, at least one Non-I-II Lewis Acid, and at least one halogen. Certain embodiments comprise heating a solid I-II Halogen Salt and a solid Non-I-II Lewis Acid Halogen Salt such that at least a portion of the solid I-II Halogen Salt melts and at least a portion of the solid Non-I-II Lewis Acid Halogen Salt melts (thus producing a molten salt comprising at least one I-II Element, at least one Non-I-II Lewis Acid, and at least one halogen). It should be understood that, when a combination of solid halogen salts is heated to form a melt, more than two solid halogen salts may be present. For example, in some embodiments, a third halogen salt, a fourth halogen salt, or additional halogen salt(s) may be present.

The melting of the one or more solid salts can, in accordance with certain embodiments, result in the formation of a fluid phase. The term "fluid phase," as used herein, refers to a phase that is flowable. In some embodiments, the fluid phase comprises a liquid, optionally also containing one or more solids (e.g., suspended solids) and/or one or more gases (e.g., dissolved gases).

The fluid phase comprises, in some embodiments, a single type of molten salt. In some such embodiments, the single type of molten salt comprises one or more I-II Elements, one or more Non-I-II Lewis Acids, and one or more halogens. For example, the fluid phase may comprise a single molten salt that takes the form $A_xD_yE_z$, where A is one or more I-II Elements, D is one or more Non-I-II Lewis Acids, and E is one or more halogens. In other embodiments, the fluid phase comprises a combination of two or more types of molten salt. As one example, in some embodiments, the fluid phase comprises a combination of at least one I-II Halogen Salt and at least one Non-I-II Lewis Acid Halogen Salt. In some embodiments, the fluid phase may comprise a molten salt and a small amount of unmolten solid salts suspended in the molten salt.

In some embodiments, a relatively large percentage (e.g., at least 50 wt %, at least 75 wt %, at least 90 wt %, at least 95 wt %, at least 99 wt %, at least 99.9 wt %, or more) of the fluid phase is made up of one or more molten salts (e.g., any of the molten salts or molten salt combinations described elsewhere herein). For example, in some embodiments, at least 50 wt %, at least 75 wt %, at least 90 wt %, at least 95 wt %, at least 99 wt %, at least 99.9 wt %, or more of the fluid phase is made up of molten salt comprising at least one I-II Element, at least one Non-I-II Lewis Acid, and/or at least one halogen. Such a molten salt can be formed, for example, by heating and at least partially melting I-II Halogen Salt(s), Non-I-II Lewis Acid Halogen Salt(s), and/or a single salt that takes the form of $A_xD_yE_z$. In certain embodiments, at least 50 wt %, at least 75 wt %, at least 90 wt %, at least 95 wt %, at least 99 wt %, at least 99.9 wt %, or more of the fluid phase is made up of molten I-II Halogen Salt(s). In some embodiments, at least 50 wt %, at least 75 wt %, at least 90 wt %, at least 95 wt %, at least 99 wt %, at least 99.9 wt %, or more of the fluid phase is made up of molten Non-I-II Lewis Acid Halogen Salt(s). In some embodiments, at least 50 wt %, at least 75 wt %, at least 90 wt %, at least 95 wt %, at least 99 wt %, at least 99.9 wt %, or more of the fluid phase is made up of molten salt of the form $A_xD_yE_z$ described herein.

Solid I-II Halogen Salt(s) can be present in the initial solid salt formulation (and/or in the fluid phase, e.g., in molten form) in any of a variety of amounts. In some embodiments, greater than or equal to 10 wt %, greater than or equal to 20 wt %, greater than or equal to 30 wt %, greater than or equal to 35 wt %, greater than or equal to 40 wt %, greater than or equal to 45 wt %, greater than or equal to 50 wt %, greater than or equal to 55 wt %, or greater than or equal to 60 wt % of the initial solid salt formulation (and/or of the molten salt within the fluid phase) is made up of one or more I-II Halogen Salts. In some embodiments, less than or equal to 90 wt %, less than or equal to 80 wt %, less than or equal to 65 wt %, less than or equal to 60 wt %, less than or equal to 55 wt %, less than or equal to 50 wt %, less than or equal to 45 wt %, less than or equal to 40 wt %, or less than or equal to 35 wt % of the initial solid salt formulation (and/or of the molten salt within the fluid phase) is made up of one or more I-II Halogen Salts. Combinations of the above-referenced ranges are possible (e.g., greater than or equal to 10 wt % and less than or equal to 90 wt %, greater than or equal to 30 wt % and less than or equal to 65 wt %). Other ranges are also possible.

Solid Non-I-II Lewis Acid Halogen Salt(s) can also be present in the initial solid salt formulation (and/or in the fluid phase, e.g., in molten form) in any of a variety of amounts. In some embodiments, greater than or equal to 10 wt %, greater than or equal to 20 wt %, greater than or equal to 35 wt %, greater than or equal to 40 wt %, greater than or equal to 45 wt %, greater than or equal to 50 wt %, greater than or equal to 55 wt %, greater than or equal to 60 wt %, or greater than or equal to 65 wt % of the initial solid salt formulation (and/or of the molten salt within the fluid phase) is made up of one or more Non-I-II Lewis Acid Halogen Salts. In some embodiments, less than or equal to 90 wt %, less than or equal to 80 wt %, less than or equal to 70 wt %, less than or equal to 65 wt %, less than or equal to 60 wt %, less than or equal to 55 wt %, less than or equal to 50 wt %, less than or equal to 45 wt %, or less than or equal to 40 wt % of the initial solid salt formulation (and/or of the molten salt within the fluid phase) is made up of one or more Non-I-II Lewis Acid Halogen Salts. Combinations of the above-referenced ranges are possible (e.g., less than or equal to 90 wt %, less than or equal to 80 wt %, greater than or equal to 35 wt % and less than or equal to 70 wt %). Other ranges are also possible.

In some embodiments, the weight ratio of Non-I-II Lewis Acid Halogen Salts to I-II Halogen Salts may be within a particular range of values. In certain embodiments, the weight ratio of Non-I-II Lewis Acid Halogen Salts to I-II Halogen Salts within the initial solid salt material (and/or within the molten salt of the fluid phase) may be greater than or equal to 1:10, greater than or equal to 1:9, greater than or equal to 1:8, greater than or equal to 1:7, greater than or equal to 1:6, greater than or equal to 1:5, greater than or equal to 1:4, greater than or equal to 1:3, greater than or equal to 1:2, greater than or equal to 2:3, greater than or equal to 1:1, greater than or equal to 3:2, greater than or equal to 2:1, greater than or equal to 3:1, greater than or equal to 4:1, greater than or equal to 5:1, greater than or equal to 6:1, greater than or equal to 7:1, greater than or equal to 8:1, or greater than or equal to 9:1. In some embodiments, a weight ratio of Non-I-II Lewis Acid Halogen Salts to I-II Halogen Salts may be less than or equal to 10:1, less than or equal to 9:1, less than or equal to 8:1, less than or equal to 7:1, less than or equal to 6:1, less than or equal to 5:1, less than or equal to 4:1, less than or equal to 3:1, less than or equal to 2:1, less than or equal to 3:2, less than or equal to 1:1, less than or equal to 2:3, less than or equal to 1:2, less than or equal to 1:3, less than or equal to 1:4, less than or equal to 1:5, less than or equal to 1:6, less than or equal to 1:7, less than or equal to 1:4, less than or equal to 1:8, or less than or equal to 1:9. Combinations of the above-referenced ranges are possible (e.g., greater than or equal to 1:10 and less than or equal to 10:1, greater than or equal to 1:5 and less than or equal to 5:1, or greater than or equal to 2:3 and less than or equal to 3:2). Other ranges are also possible.

A solid salt of the form $A_xD_yE_z$ (as described above and elsewhere herein), when used, can be present in the initial solid salt formulation (and/or in the fluid phase, e.g., in molten form) in any of a variety of amounts. In some embodiments, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %, or all of the initial solid salt formulation (and/or of the molten salt within the fluid phase) is made up of one or more salts having the formula $A_xD_yE_z$.

In some embodiments, solid salt $A_xD_yE_z$ may comprise a particular amount of I-II-Element (A), Non-I-II Lewis Acid (D), and halogen (E). That is, solid salt $A_xD_yE_z$ may comprise a particular range of values of x, y, and z. In some embodiments, x may be from 0.5*y to 1.5*y (or from 0.7*y to 1.3*y, from 0.8*y to 1.2*y, or from 0.9*y to 1.1*y). In some embodiments, z may be equal to x+ny, wherein n is an integer greater than 0 (e.g., 2, 3, or 4).

The atomic percentage (at %) of I-II Elements in the initial solid salt formulation (and/or in the fluid phase, e.g., in molten form) can have any of a variety of values. In some embodiments, the I-II Elements may be present in an amount of greater than or equal to 10 at %, greater than or equal to 20 at %, greater than or equal to 30 at %, greater than or equal to 33 at %, greater than or equal to 40 at %, greater than or equal to 50 at %, or greater than or equal to 60 at % of the total number of atoms in the initial solid salt formulation (and/or in the fluid phase, e.g., in molten form). In some embodiments, the I-II Elements may be present in an amount of less than or equal to 90 at %, less than or equal to 80 at %, less than or equal to 70 at %, less than or equal to 66 at %, less than or equal to 60 at %, less than or equal to 50 at %, or less than or equal to 40 at % of the total number of atoms in the initial solid salt formulation (and/or in the fluid phase, e.g., in molten form). Combinations of the above-referenced ranges are possible (e.g., greater than or equal to 10 at % and less than or equal to 90 at %, greater than or equal to 33 at % and less than or equal to 66 at %). Other ranges are also possible.

The atomic percentage (at %) of Non-I-II Lewis Acids (or Non-I-II Lewis Acid Halogen Salts) in the initial solid salt formulation (and/or in the fluid phase, e.g., in molten form) can have any of a variety of values. In some embodiments, the Non-I-II Lewis Acids (or Non-I-II Lewis Acid Halogen Salts) may be present in an amount of greater than or equal to 10 at %, greater than or equal to 20 at %, greater than or equal to 30 at %, greater than or equal to 33 at %, greater than or equal to 40 at %, greater than or equal to 50 at %, or greater than or equal to 60 at % of the total number of atoms in the initial solid salt formulation (and/or in the fluid phase, e.g., in molten form). In some embodiments, the Non-I-II Lewis Acids (or Non-I-II Lewis Acid Halogen Salts) may be present in an amount of less than or equal to 90 at %, less than or equal to 80 at %, less than or equal to 70 at %, less than or equal to 66 at %, less than or equal to 60 at %, less than or equal to 50 at %, or less than or equal to 40 at % of the total number of atoms in the initial solid salt formulation (and/or in the fluid phase, e.g., in molten form). Combinations of the above-referenced ranges are possible (e.g., greater than or equal to 10 at % and less than or equal to 90 at %, greater than or equal to 33 at % and less than or equal to 66 at %). Other ranges are also possible.

The atomic ratios of I-II Elements to Non-I-II Lewis Acids in the initial solid salt formulation (and/or in the fluid phase, e.g., in molten form) can have any of a variety of values. In some embodiments, the atomic ratios of I-II Elements to Non-I-II Lewis Acids may be greater than or equal to 1:2, greater than or equal to 2:3, greater than or equal to 1:1, or greater than or equal to 3:2. In some embodiments, the atomic ratios of I-II Elements to Non-I-II Lewis Acids may be less than or equal to 2:1, less than or equal to 3:2, less than or equal to 1:1, or less than or equal to 2:3. Combinations of the above-referenced ranges are possible (e.g., greater than or equal to 1:2 and less than or equal to 2:1). Other ranges are also possible.

In some embodiments, an atomic ratio of the total amount of Non-I-II Lewis Acid cations to the total amount of I-II Element cations (e.g., in the initial solid salt and/or in the fluid phase (e.g., in the molten form)) is at least 1:1, at least 3:2, at least 2:1, at least 3:1, or at least 4:1 (and/or, in some embodiments, less than or equal to 20:1, less than or equal to 15:1, or less than or equal to 10:1). In some such embodiments, more than one I-II Element may be present in the initial solid salt formulation and/or in the fluid phase (e.g., in the molten form). The presence of more than one I-II Element in the initial solid salt and/or the fluid phase may advantageously stabilize the presence of the Non-I-II Lewis Acids and reduce the amount of harmful halogen gas that is formed, as described in more detail below.

I-II Elements can be present in the initial solid salt formulation (and/or in the fluid phase, e.g., in molten form) in any of a variety of amounts. In some embodiments, greater than or equal to 10 wt %, greater than or equal to 20 wt %, greater than or equal to 30 wt %, greater than or equal to 35 wt %, greater than or equal to 40 wt %, greater than or equal to 45 wt %, greater than or equal to 50 wt %, greater than or equal to 55 wt %, or greater than or equal to 60 wt % of the initial solid salt formulation (and/or of the molten salt within the fluid phase) is made up of one or more I-II Elements. In some embodiments, less than or equal to 90 wt %, less than or equal to 80 wt %, less than or equal to 65 wt %, less than or equal to 60 wt %, less than or equal to 55 wt %, less than or equal to 50 wt %, less than or equal to 45 wt %, less than or equal to 40 wt %, or less than or equal to 35 wt % of the initial solid salt formulation (and/or of the molten salt within the fluid phase) is made up of one or more I-II Elements. Combinations of the above-referenced ranges are possible (e.g., greater than or equal to 10 wt % and less than or equal to 90 wt %, greater than or equal to 30 wt % and less than or equal to 65 wt %). Other ranges are also possible. In some embodiments in which two or more different I-II Elements are present in the solid salt material(s), the two or more different I-II Elements may each or together make up an amount in any of the above-referenced ranges.

Non-I-II Lewis Acids can also be present in the initial solid salt formulation (and/or in the fluid phase, e.g., in molten form) in any of a variety of amounts. In some embodiments, greater than or equal to 10 wt %, greater than or equal to 20 wt %, greater than or equal to 35 wt %, greater than or equal to 40 wt %, greater than or equal to 45 wt %, greater than or equal to 50 wt %, greater than or equal to 55 wt %, greater than or equal to 60 wt %, or greater than or equal to 65 wt % of the initial solid salt formulation (and/or of the molten salt within the fluid phase) is made up of one or more Non-I-II Lewis Acids. In some embodiments, less than or equal to 90 wt %, less than or equal to 80 wt %, less than or equal to 70 wt %, less than or equal to 65 wt %, less than or equal to 60 wt %, less than or equal to 55 wt %, less than or equal to 50 wt %, less than or equal to 45 wt %, or less than or equal to 40 wt % of the initial solid salt formulation (and/or of the molten salt within the fluid phase) is made up of one or more Non-I-II Lewis Acids. Combinations of the above-referenced ranges are possible (e.g., greater than or equal to 10 wt % and less than or equal to 90 wt %, greater than or equal to 35 wt % and less than or equal to 70 wt %). Other ranges are also possible. In some embodiments in which two or more different Non-I-II Lewis Acids are present in the solid salt material(s), the two or more different Non-I-II Lewis Acids may each or together make up an amount in any of the above-referenced ranges.

The use of one or more halogen salts comprising multiple cations (e.g., I-II Elements and/or Non-I-II Lewis Acids) may provide a number of advantages, according to certain embodiments. For example, in certain instances, when both a I-II Element and a Non-I-II Lewis Acid are present (e.g., such as when a Non-I-II Lewis Acid Halogen Salt is added to a I-II Halogen Salt, or when both are present in combination), the melting point of the combination (relative to the melting point of a corresponding halogen salt in which only the I-II Element is present) can be lowered. The lowering of the melting point can enhance processability and reduce the amount of energy required to conduct the metal separation. Lowering the temperature of operation may also reduce volatilization of harmful chemicals (thus, enhancing the safety of operation), reduce energy input, and/or lower the capital cost associated with the process. Advantageously, in some embodiments, the presence of a I-II Element may reduce the volatility of the Non-I-II Lewis Acid within a molten salt comprising one or more I-II Elements, one or more Non-I-II Lewis Acid, and one or more halogens. For example, in some such embodiments, using a I-II Halogen Salt may reduce the volatility of the Non-I-II Lewis Acid Halogen Salt. This can result in little or no volatilization of the Non-I-II Lewis Acid Halogen Salt during the process, making the process safer and more stable. In some embodiments, less than 10 vol % (e.g., less than 8 vol %, less than 5 vol %, less than 3 vol %, less than 2 vol %, less than 1 vol %, less than 0.5 vol %, or none) of the Non-I-II Lewis Acid Halogen volatilizes during operation.

In some embodiments, the use of an effective amount of Non-I-II Lewis Acid may lead to a reduction of melting point of a solid salt material that comprises one or more I-II Elements, one or more Non-I-II Lewis Acids, and one or more halogens. In one set of embodiments, the use of an effective amount of Non-I-II Lewis Acid may lead to a reduction of melting point of a combination (relative to the melting point of solid I-II Halogen Salt(s)). An effective amount of Non-I-II Lewis Acid (or Non-I-II Lewis Acid Halogen Salt) may be any suitable amount described previously. In some embodiments, the amount of Non-I-II Lewis Acid present in the solid salt material is sufficient to reduce the melting point of the solid salt material (relative to the same solid salt material but not containing the Non-I-II Lewis Acid) by at least 50° C., at least 100° C., at least 150° C. (and/or, in some embodiments, as much as 600° C., as much as 700° C., as much as 800° C., or more).

For example, in one set of embodiments, a Non-I-II Lewis Acid Halogen Salt (e.g., $FeCl_3$), when used together with a I-II Halogen Salt (e.g., KCl), may advantageously lower the melting point of the salt mixture such that melting of the combination of the salts can be achieved at a lower operating temperature (relative to the melting point of the I-II Halogen Salt alone). As one example, ferric chloride ($FeCl_3$), when present in a suitable amount (e.g., 40 wt %) of the combination, may reduce the melting point of the combination by a substantial amount (e.g., 270° C. to 320° C.) relative the melting point of KCl (770° C.).

In some embodiments, the use of two or more different I-II Elements (in addition to a Non-I-II Lewis Acid) may provide any of a number of advantages, relative to systems in which a single I-II Element is employed. In some embodiments, the use of two or more different I-II Elements (rather than the use of a single I-II Element) can further enhance stabilization of the combination of halogen salts, minimize vaporization of the Non-I-II Lewis Acid Halogen during heating, and thus allow the formation of a stable molten salt with little, if any, halogen gas formation. According to some embodiments, less than 5 vol % (e.g., less than 4 vol %, less than 3 vol %, less than 2 vol %, less than 1 vol %, less than 0.5 vol %, or none) of the Non-I-II Lewis Acid Halogen volatilizes during operation. In some embodiments, essentially no halogen gas (e.g. chlorine gas) is formed during the heating process.

For example, in one set of embodiments, the use of two I-II Elements (e.g., $K^+$ from KCl and $Na^+$ from NaCl) together with a Non-I-II Lewis Acid (e.g., Fe cations such as those from $FeCl_3$) may advantageously stabilize the combination of salts and suppress vaporization of the Non-I-II Lewis Acid Halogen Salt to reduce formation of undesirable halogen gas during heating. The two I-II Elements may be present in any of a variety of ratios in the initial solid salt formulation (and/or in the fluid phase, e.g., in molten form). For example, in some embodiments, a weight ratio of a first I-II Element to a second I-II Element may be at least 1:5 (at least 1:3, at least 1:2, at least 1:1, at least 2:1, at least 3:1, at least 5:1, etc.) Other ranges may also be possible.

In some embodiments in which more than one I-II Element is present, each of the I-II Elements can be present in a substantial amount. For example, in some embodiments, each of the I-II Elements is present (e.g., in the initial salt and/or in the fluid phase (e.g., in molten form)) in an amount of at least 0.1 wt %, at least 0.5 wt %, at least 1 wt %, at least 2 wt %, at least 5 wt %, or more.

In some embodiments, the presence of two or more different I-II Elements in the combination stabilizes the combination such that a relatively higher amount of Non-I-II Lewis Acid material may be used in the combination (when compared to the amount used in the presence of a single I-II Element).

In some embodiments, it may be advantageous to use more than one halogen anion (e.g., in the initial salt and/or in the fluid phase (e.g., in molten form)). The halogen anions may be selected from among any of the halogens described elsewhere herein. In one set of embodiments, Cl and F anions may be present. In one set of embodiments, Cl and Br anions may be present. In some embodiments, the presence of an anion (e.g., a halogen anion such as Br and/or F) in addition to Cl may advantageously suppress the formation of $Cl_2$. The halogen anions may be present in the initial solid salt materials and/or added to the system (e.g., fluid phase) during and/or after heating of the solid salt materials. In some embodiments in which more than one halogen anion is present, each of the halogen anions can be present (e.g., in the initial salt and/or in the fluid phase (e.g., in molten form)) in an amount of at least 0.1 wt %, at least 0.5 wt %, at least 1 wt %, at least 2 wt %, at least 5 wt %, or more.

In some embodiments, a relatively high degree of melting of the halogen salt(s) may be achieved during heating. In accordance with certain embodiments, when a relatively high degree of melting of the halogen salt(s) is achieved, the system may exhibit one or more enhancements in performance such as faster removal of metal from a subsequently processed metal-containing material (e.g., via faster reaction kinetics and/or faster dissolution).

In some embodiments, at least a portion (or a substantial amount of, or all) of the Non-I-II Lewis Acid Halogen Salt(s) are molten during the process. For example, in some embodiments, at least 50 vol % (or at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, or all) of Non-I-II Lewis Acid Halogen Salt(s) are molten during the process. One unexpected discovery associated with the present disclosure is that a relatively high percentage of Non-I-II Lewis Acid Halogen Salt(s) can be melted at relatively low temperatures (e.g., any of the temperatures described herein) when combined with one or more I-II Halogen Salts. This can be achieved, for example, by having both types of salts (i.e., at least one I-II Halogen Salt and at least one Non-I-II Lewis Acid Halogen Salt) present at the outset of the heating step, and heating both salts together. When an initial combination of multiple solid halogen salts is employed, each solid Non-I-II Lewis Acid Halogen Salt may independently melt in an amount within one or more of the ranges described above and/or all of the Non-I-II Lewis Acid Halogen Salts may together melt in an amount within one or more of the ranges described above.

In some embodiments, at least a portion (or a substantial amount of, or all) of the I-II Halogen Salts are molten during the process. For example, in some embodiments, at least 50 vol % (or at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, or all) of the I-II Halogen Salt(s) are molten during the process. These degrees of melting of the solid I-II Halogen Salt(s) can be achieved in the presence of or in the absence of the solid Non-I-II Lewis Acid Halogen Salt(s). When an initial combination of multiple solid halogen salts is employed, each solid I-II halogen Salt may independently melt in an amount within one or more of the ranges described above and/or all of the I-II Halogen Salts may together melt in an amount within one or more of the ranges described above. For example, according to certain embodiments, at least 95 vol % of each of I-II Halogen Salt(s) and Non-I-II Lewis Acid Halogen Salt(s) melts during the process.

One example of a case in which a high percentage of the solid salt(s) is melted is shown in FIG. 1B, in which 100% of the solid salts have been melted.

In some embodiments in which a single solid salt having the form of $A_xD_yE_z$ is used, at least a portion (or a substantial amount of, or all) of the single solid salt melts. In some embodiments, the presence of a Non-I-II Lewis Acid (e.g., D) in the single solid salt $A_xD_yE_z$ increases the degree of melting of the single solid salt. In some embodiments, at least 50 vol % (or at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, or all) of the single solid salt $A_xD_yE_z$ melts during the process.

In some embodiments, the solid salt(s) (e.g., any of the single salts or combinations of salts described above) may be heated to a variety of suitable temperatures (e.g., under a suitable pressure disclosed herein) to create the fluid phase. In some embodiments, the solid salt(s) may be heated to a temperature of greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 450° C., greater than or equal to 500° C., greater than or equal to 550° C., greater than or equal to 600° C., or greater than or equal to 650° C. In some embodiments, the solid salt(s) described herein may be heated to a temperature of less than or equal to 700° C., less than or equal to 650° C., less than or equal to 600° C., less than or equal to 550° C., less than or equal to 500° C., less than or equal to 450° C., less than or equal to 400° C., less than or equal to 350° C., less than or equal to 300° C., less than or equal to 250° C., less than or equal to 200° C., or less than or equal to 150° C. Combinations of the above-referenced ranges are possible (e.g., greater than or equal to 100° C. and less than or equal to 500° C., greater than or equal to 150° C. and less than or equal to 450° C., or greater than or equal to 100° C. and less than or equal to 300° C.). Other ranges are also possible.

In some embodiments, halogen gas (e.g., chlorine gas) is not formed during the heating of the solid salt(s). In some such embodiments, the solid salt(s) can be heated to form a molten salt without forming halogen gas when the salt(s) are heated to a temperature of at least 150° C. (e.g., at least 200° C., at least 250° C., at least 300° C., or at least 350° C.).

In some embodiments, the solid salt(s) (e.g., any of the single salts or combinations of salts described above) may be heated to a suitable temperature under a variety of suitable pressures. In some embodiments, the solid salt(s) may be heated under a pressure of greater than or equal to 0.1 atm, greater than or equal to 0.5 atm, greater than or equal to 0.75 atm, greater than or equal to 0.9 atm, greater than or equal to 1 atm, greater than or equal to 2.5 atm, greater than or equal to 5 atm, greater than or equal to 7.5 atm, greater than or equal to 10 atm, or greater than or equal to 12.5 atm. In some embodiments, the solid salt(s) may be heated under a pressure of less than or equal to 15 atm, less than or equal to 12.5 atm, less than or equal to 10 atm, less than or equal to 7.5 atm, less than or equal to 5 atm, less than or equal to 2.5 atm, less than or equal to 1.25 atm, less than or equal to 1.1 atm, less than or equal to 1 atm, or less than or equal to 0.5 atm. Combinations of the above-referenced ranges are possible (e.g., greater than or equal to 0.1 atm and less than or equal to 15 atm, greater than or equal to 0.75 atm and less than or equal to 1.25 atm, or greater than or equal to 1 atm and less than or equal to 5 atm). Other ranges are also possible.

Advantageously, in some embodiments, the solid salt(s) (e.g., any of the single salts or combinations of salts described above) may be heated without or with minimal external agitation or stirring due to a rapid rate of melting of the halogen salt(s). For instance, in one set of embodiments, at least a portion of the combination may melt when heated without external stirring.

In some embodiments, once solid salt(s) has been melted, the fluid phase can contain a relatively high amount of alkali metal(s), alkaline earth metal(s), Non-I-II Lewis Acid(s), and halogen(s). In some embodiments, at least 50 wt %, at least 75 wt %, at least 90 wt %, at least 95 wt %, at least 99 wt %, at least 99.9 wt %, at least 99.99 wt %, or all of the fluid phase is made up of (1) halogen(s) and (2) alkali metal(s), alkaline earth metal(s), and/or Non-I-II Lewis Acid(s) in molten salt form. In some embodiments, at least 50 wt %, at least 75 wt %, at least 90 wt %, at least 95 wt %, at least 99 wt %, at least 99.9 wt %, at least 99.99 wt %, or all of the fluid phase is made up of (1) alkali metal(s) and/or alkaline earth metal(s), (2) Non-I-II Lewis Acid(s), and (3) halogen(s) in molten salt form.

Figure 1C:
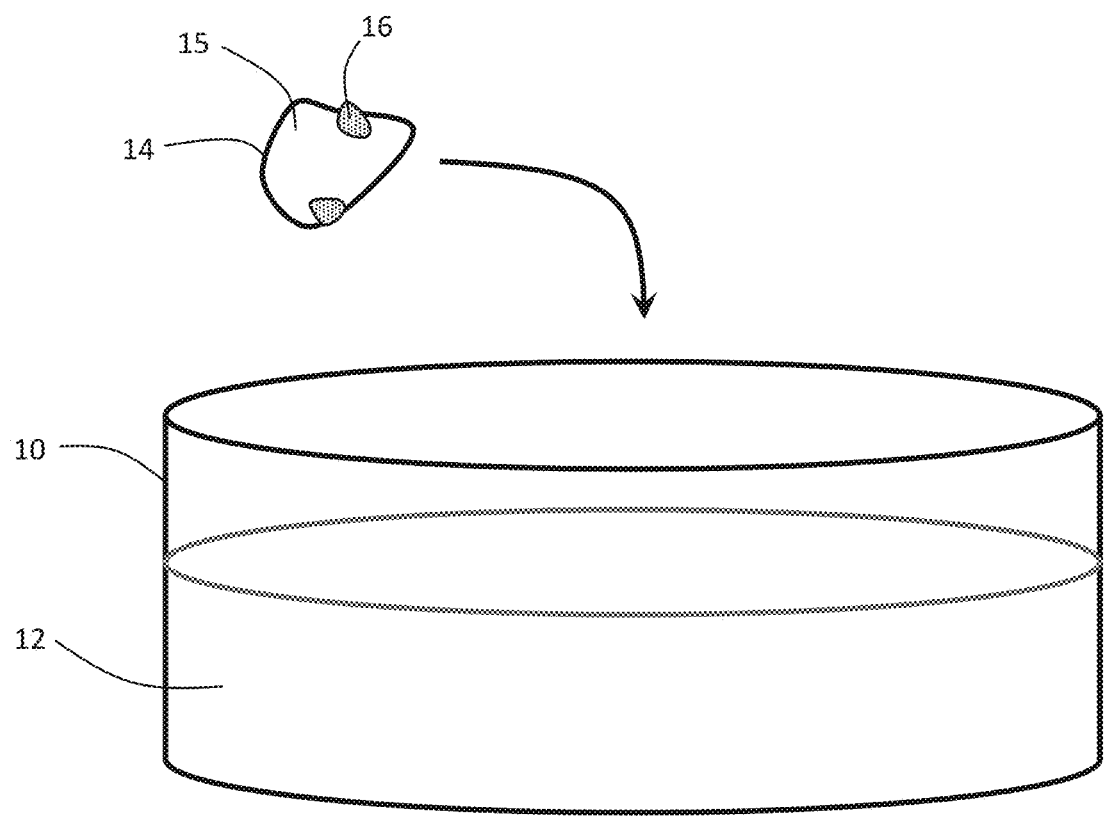
Figure 1D:
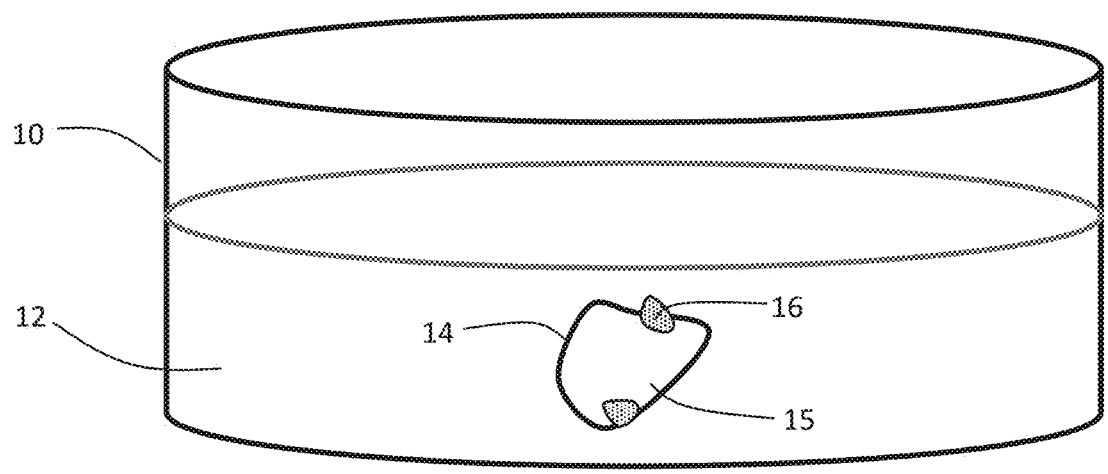

As noted above, in some embodiments, once the fluid phase (e.g., containing one or more molten salt(s)) has been formed, the method comprises exposing a target-metal-containing material to the fluid phase. Non-limiting examples are shown, for example, in FIGS. 1C-1D. In FIGS. 1C-1D, target-metal-containing material 14 comprises target metal material 16 and non-target-metal material 15. Target metal material 16 can be, for example, disposed within and/or on a surface of non-metal material 15. As shown in FIG. 1D, target-metal-containing material 14 has been added to fluid phase 12 (e.g., containing a single molten halogen salt or a combination of multiple molten halogen salts) such that fluid phase 12 contacts target-metal-containing material 14.

As noted above, "target metal" refers to metal that is (1) in a zero oxidation state or (2) is in a non-zero oxidation state form within a compound other than a halogen compound or an oxide compound. "Target metal material" refers to the zero oxidation state metal and the non-halogen, non-oxide metal compounds within the target-metal-containing material. The "non-target-metal material" of the target-metal-containing material refers to the materials within the target-metal-containing material that are metal oxides, metal halogens, or materials that contain no metal (e.g., polymers, etc.). For example, $Al_2O_3$ and $AlCl_3$ would both qualify as a non-target-metal materials even though they both contain Al (a metal element) because the Al is present in an oxide form and a halogen (chloride) form, respectively. In addition, polyvinyl chloride would qualify as a non-target-metal material because it does not contain metal.

A variety of suitable target-metal-containing materials may be employed. Non-limiting examples of target-metal-containing material include, but are not limited to, scrap metal, recycled metal feed, mining tailings, mineral ores, dust particles, used catalysts, and spent electrodes.

Non-limiting examples of target metals that may be present in the metal-containing material (and which may be recovered, as described in more detail below) include noble metals (i.e., gold, silver, platinum, osmium, iridium, rhodium, ruthenium, and/or palladium) and/or transition metals. In some embodiments, the target metal present in the target-metal-containing material comprises one or more platinum group metals (PGMs) (i.e., platinum (Pt), palladium (Pd), rhodium (Rh), iridium (Ir), osmium (Os), and ruthenium (Ru)). In some embodiments, the target metal of the target-metal-containing material comprises copper (Cu), nickel (Ni), cobalt (Co), chromium (Cr), vanadium (V), hafnium (Hf), niobium (Nb), molybdenum (Mo), tantalum (Ta), and/or tungsten (W). In certain embodiments, it can be particularly advantageous to use the systems and methods described herein to recover gold, silver, platinum, osmium, iridium, rhodium, ruthenium, and/or palladium as target metal(s).

Non-limiting examples of non-target-metal material that may be present in the target-metal-containing material (and which may be separated from the target metal(s) of the target-metal-containing material, as described in more detail below) include oxides. The non-target-metal containing material can also include, in some embodiments, halogens (e.g., fluorides, chlorides, etc.). In some embodiments, the oxides and/or halogens comprise metal oxides and/or metal halogens (e.g., metal fluorides). In some embodiments, the non-target-metal material in the target-metal-containing material comprises a ceramic. In some embodiments, the non-target-metal material in the target-metal-containing material comprises silicon oxide(s) (e.g., silica and/or silicate), aluminum oxide(s) (e.g., aluminate), zirconium oxide(s) (e.g., zirconia), calcium oxide(s) (e.g., CaO), rare earth oxide(s), and/or titanium oxide(s) (e.g., titania and/or titanate). In certain embodiments, the non-target-metal material in the target-metal-containing material comprises mullite and/or ceramic. In some embodiments, the non-target-metal material of the target-metal-containing materials comprises a polymer (e.g., fluoropolymers, high weight polyethylene, chloropolymers, etc.). Combinations of these materials and/or combinations of these and other materials may also be present.

The target-metal-containing material can be exposed to the fluid phase by any of a variety of suitable mechanisms. In some embodiments, the target-metal-containing material is exposed to the fluid phase by adding the target-metal-containing material to an already-formed fluid phase containing the one or more molten salt(s). One such example is shown in FIGS. 1A-1D. As described above, the solid halogen salts shown in FIG. 1A are melted to form the molten salt fluid phase 12 in FIG. 1B. In FIG. 1C, after fluid phase 12 has been formed, target-metal-containing material 14 is added to fluid phase 12 to produce a fluid phase in which molten salt is in direct contact with the target-metal-containing material 14 (as shown in FIG. 1D). In certain cases, it can be advantageous to first melt the solid halide salt(s) and subsequently add target-metal-containing material to the molten solid halide salt(s), as doing so can make processing and removal of the target-metal-containing material easier.

Figure 1E:
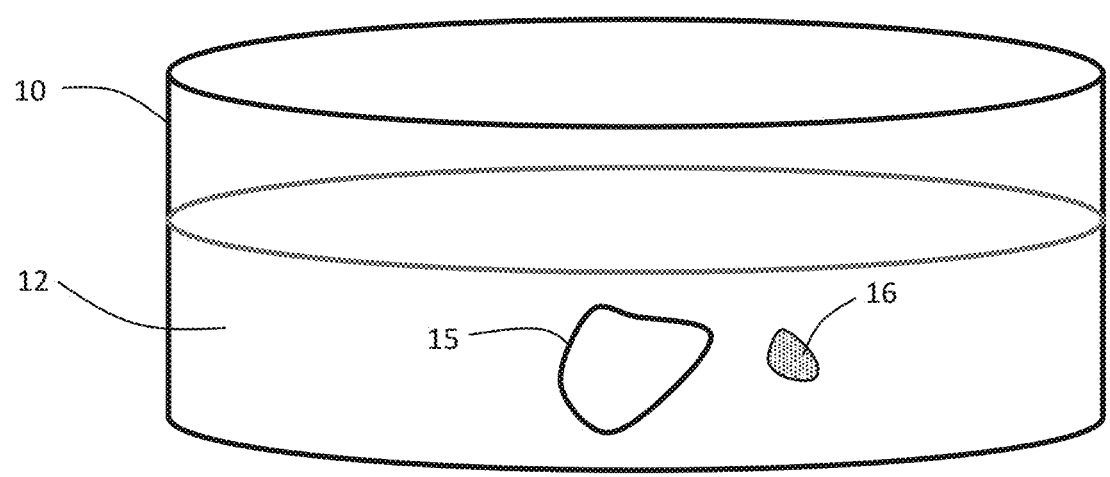

While FIGS. 1C-1E show a set of embodiments in which the target-metal-containing material is added to an already-formed bath of molten salt(s) (and such addition can be advantageous, as described above), it should be understood that not all embodiments described herein are so limiting, and in other embodiments, the target-metal-containing material may be exposed to the fluid phase comprising the halogen salt(s) in any other appropriate order or manner. For instance, in one set of embodiments, the target-metal-containing material may be first added to a solid halogen salt(s) to form a solid mixture, after which the mixture may be heated such that at least a portion of the halogen salt(s) melts. In some such embodiments, as the solid halogen salt(s) melts, the target-metal-containing material can become exposed to the molten salt(s), which can lead to removal of metal from the target-metal-containing material.

In some embodiments, the molten salt(s) within the fluid phase may, upon contact with a target-metal-containing material, cause the at least partial (or complete) removal of the accessible target metal from the target-metal-containing material (which can leave behind one or more non-target-metal materials). In this context, "accessible target metal" is used herein to describe the target metal of the target-metal-containing material that can be contacted by the molten salt without removing non-target-metal material. Accessible target metal includes both the target metal that is accessible by the molten salt prior to removing target metal as well as target metal accessible after overlying target metal has been removed. Accessible target metal would not include target metal that is completely surrounded by non-target-metal material, as non-target-metal material would need to be removed before accessing the surrounded target metal. For example, in FIG. 1D, molten salt(s) within fluid phase 12 is in direct contact with target-metal-containing material 14. This can lead to the removal of target metal 16 from target-metal-containing material 14 as shown, for example, in FIG. 1E (where target metal 16 has been separated from non-target-metal material 15). In certain embodiments, the molten salt(s) directly contact the target metal within the metal-containing material. In some embodiments, the presence of one or more molten salt(s) may allow for relatively efficient removal of metal(s) from target-metal-containing materials that would typically be inaccessible via traditional metal removal methods (e.g., aqueous or solid-state routes).

In some embodiments, exposing (e.g., adding) the target-metal-containing material to the fluid phase comprising the molten salt(s) may lead to the removal of a relatively large portion of the accessible target metal from the target-metal-containing material. For example, in some embodiments, exposing the target-metal-containing material to the fluid phase comprising the molten salt(s) can result in the removal of at least 25 wt %, at least 30 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 99 wt %, or all of one or more accessible target metals (or all accessible target metals) from the target-metal-containing material.

In some embodiments, exposing (e.g., adding) the target-metal-containing material to the fluid phase comprising the molten salt(s) may lead to the removal of a relatively large portion of both accessible and inaccessible target metal from the target-metal-containing material. For example, in some embodiments, exposing the target-metal-containing material to the fluid phase comprising the molten salt(s) can result in the removal of at least 25 wt %, at least 30 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 99 wt %, or all of both accessible and inaccessible target metals from the target-metal-containing material.

The target metal can be removed from the target-metal-containing material in a number of ways. In some embodiments, removal of target metal (e.g., accessible target metal) from the target-metal-containing material comprises dissolving at least a portion of the target metal out of the target-metal-containing material. After dissolution, the target metal may move into the fluid phase comprising the molten salt. For example, referring again to FIGS. 1D-1E, target metal 16 in target-metal-containing material 14 can be dissolved by molten salt within fluid phase 12, in some embodiments. As shown in FIG. 1E, target metal 16 has moved into the fluid phase 12.

In some embodiments, at least a portion of the target metal in the target-metal-containing material reacts with one or more molten salts within the fluid phase to form a metal halide. In some such embodiments, to form the metal halide, the target metal reacts with a halogen from a molten I-II Halogen Salt and/or a Non-I-II Lewis Acid Halogen Salt. In some embodiments, the resultant metal halide comprises one or more of noble metal halides and/or transition metal halides. In some such embodiments, reacting a portion of the target metal in the target-metal-containing material with a halogen salt or combination of halogen salts comprises reacting at least 65 wt %, at least 70 wt %, at least 75 wt %, at least 80 wt %, at least 85 wt %, at least 90 wt %, at least 95 wt %, at least 99 wt %, or all of the removed (e.g., dissolved) target metals from the target-metal-containing material with a halogen from a molten halogen salt(s).

In some embodiments, the Non-I-II Lewis Acid Halogen Salt may be present in the fluid phase in at least a stoichiometric amount needed to react with the target metal from the target-metal-containing material to form a metal halide. For example, in some embodiments, the fluid phase contains Non-I-II Lewis Acid Halogen Salt(s) such that the number of halogen ions contributed by the Non-I-II Lewis Acid Halogen Salt(s) are at least 1.1, at least 1.2, at least 1.3, at least 1.4, or at least 1.5 of the stoichiometric amount required to completely react the target metal of the target-metal-containing material to form metal halide.

In some embodiments, at least one accessible target metal is selectively removed from the target-metal-containing material, relative to at least one non-target-metal material. In some such embodiments, selective removal of accessible target metal from the target-metal-containing material comprises selective dissolution of at least one accessible target metal from the target-metal-containing material into the fluid phase comprising the molten salt. In one set of embodiments, at least a portion of at least one accessible target metal that is a transition metal is selectively removed from the target-metal-containing material. In some embodiments, at least one accessible target metal that is a noble metal is selectively removed from the target-metal-containing material. In certain embodiments, at least a portion of all accessible target metals are selectively removed from the target-metal-containing material.

In one set of embodiments, the ratio of mass of accessible target metal removed (e.g., dissolved) from the target-metal-containing material to the mass of non-target-metal material removed (e.g., dissolved) from the target-metal-containing material may fall within a particular range of values.

In some embodiments, the ratio of mass of at least one (or all) accessible target metals removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals removed from the target-metal-containing material to the mass of at least one (or all) non-target-metal materials removed from the target-metal-containing material is up to 100,000:1, up to $10^7:1$, up to $10^9:1$, or higher. Combinations of the above-referenced ranges are possible (e.g., at least 1.1:1 and up to $10^9:1$). Other ranges are also possible.

In some embodiments, the ratio of mass of at least one (or all) target metals (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals (both accessible and otherwise) removed from the target-metal-containing material to the mass of at least one (or all) non-target-metal materials removed from the target-metal-containing material is up to 100,000:1, up to $10^7:1$, up to $10^9:1$, or higher. Combinations of the above-referenced ranges are possible (e.g., at least 1.1:1 and up to $10^9:1$). Other ranges are also possible.

In some embodiments, the ratio of mass of at least one (or all) accessible target metals removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is up to 100,000:1, up to $10^7:1$, up to $10^9:1$, or higher. Combinations of the above-referenced ranges are possible (e.g., at least 1.1:1 and up to $10^9:1$). Other ranges are also possible.

In some embodiments, the ratio of mass of at least one (or all) target metals (both accessible and otherwise) removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals (both accessible and otherwise) removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is up to 100,000:1, up to $10^7:1$, up to $10^9:1$, or higher. Combinations of the above-referenced ranges are possible (e.g., at least 1.1:1 and up to $10^9:1$). Other ranges are also possible.

In some embodiments, metal oxides and metalloid oxides (e.g., silicon oxides, aluminum oxides, titanium oxides, zirconium oxides, rare earth oxides, etc.) exhibit essentially no dissolution or other decomposition in the molten salt. In certain embodiments, the ratio of mass of at least one (or all) accessible target metals removed from the target-metal-containing material to the mass of silicon oxides (e.g., silicates, silicon dioxide, etc.) removed from the targetmetal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals removed from the target-metal-containing material to the mass of silicon oxides (e.g., silicates, silicon dioxide, etc.) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In certain embodiments, the ratio of mass of at least one (or all) target metals (both accessible and otherwise) removed from the target-metal-containing material to the mass of silicon oxides (e.g., silicates, silicon dioxide, etc.) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals (both accessible and otherwise) removed from the target-metal-containing material to the mass of silicon oxides (e.g., silicates, silicon dioxide, etc.) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals removed from the target-metal-containing material to the mass of aluminum oxides (e.g., alumina, aluminates) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals removed from the target-metal-containing material to the mass of aluminum oxides (e.g., alumina, aluminates) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals (both accessible and otherwise) removed from the target-metal-containing material to the mass of aluminum oxides (e.g., alumina, aluminates) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals (both accessible and otherwise) removed from the target-metal-containing material to the mass of aluminum oxides (e.g., alumina, aluminates) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In certain embodiments, the ratio of mass of at least one (or all) accessible target metals removed from the target-metal-containing material to the mass of titanium oxides (e.g., titania, titanates) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals removed from the target-metal-containing material to the mass of titanium oxides (e.g., titania, titanates) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In certain embodiments, the ratio of mass of at least one (or all) target metals (both accessible and otherwise) removed from the target-metal-containing material to the mass of titanium oxides (e.g., titania, titanates) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals (both accessible and otherwise) removed from the target-metal-containing material to the mass of titanium oxides (e.g., titania, titanates) removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are PGMs removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are PGMs removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are PGMs (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals that are PGMs (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are PGMs removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are PGMs removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are PGMs (both accessible and otherwise) removed from the target-metal-containing material to the mass of at least one (or all) oxides removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals that are PGMs (both accessible and otherwise) removed from the target-metal-containing material to the mass of at least one (or all) oxides removed from the metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are noble metals removed from the target-metal-containing material to the mass of at least one (or all) non-target-metal material removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are noble metals removed from the target-metal-containing material to the mass of at least one (or all) non-target-metal material removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are noble metals (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals that are noble metals (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are noble metals removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are noble metals removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are noble metals (both accessible and otherwise) removed from the target-metal-containing material to the mass of at least one (or all) oxides removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals that are noble metals (both accessible and otherwise) removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are transition metals removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are transition metals removed from the target-metal-containing material to the mass of at least one (or all) non-target-metal material removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are transition metals (both accessible and otherwise) removed from the target-metal-containing material to the mass of at least one (or all) non-target-metal material removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals that are transition metals (both accessible and otherwise) removed from the target-metal-containing material to the mass of at least one (or all) non-target-metal material removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) accessible target metals that are transition metals removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals that are transition metals removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals that are transition metals (both accessible and otherwise) removed from the target-metal-containing material to the mass of at least one (or all) oxides removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher.

In some embodiments, target metal(s) present in a non-zero oxidation state can be selectively removed from the target-metal-containing material(s). In some embodiments, the ratio of mass of at least one (or all) accessible target metals present in a non-zero oxidation state removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) accessible target metals present in a non-zero oxidation state removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) target metals present in a non-zero oxidations state (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) target metals present in a non-zero oxidation state (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, platinum metals present in a non-zero oxidation state may be selectively removed from platinum-containing materials (e.g., platinum sulfide, platinum carbonate, platinum arsenide, and/or platinum phosphate). In some embodiments, the ratio of mass of accessible platinum metals present in non-zero oxidation states removed from the target-metal-containing material(s) to the mass of at least one (or all) non-target-metal materials removed from the target-metal-containing material(s) is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of accessible platinum metals present in non-zero oxidation states removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of platinum metals present in non-zero oxidation states (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of platinum metals present in non-zero oxidation states (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) target metals that are transition metals (both accessible and otherwise) removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) of the accessible target metals that are Cu, Ni, Co, Cr, V, Hf, Nb, Mo, Ta, and/or W removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the accessible target metals that are Cu, Ni, Co, Cr, V, Hf, Nb, Mo, Ta, and/or W removed from the target-metal-containing material to the mass of at least one (or all) non-target-metal material removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) of the target metals that are Cu, Ni, Co, Cr, V, Hf, Nb, Mo, Ta, and/or W (both accessible and otherwise) removed from the target-metal-containing material to the mass of at least one (or all) non-target metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the target metals that are Cu, Ni, Co, Cr, V, Hf, Nb, Mo, Ta, and/or W (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) of the accessible target metals that are Cu, Ni, Co, Cr, V, Hf, Nb, Mo, Ta, and/or W removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the accessible target metals that are Cu, Ni, Co, Cr, V, Hf, Nb, Mo, Ta, and/or W removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) of the target metals that are Cu, Ni, Co, Cr, V, Hf, Nb, Mo, Ta, and/or W (both accessible and otherwise) removed from the target-metal-containing material to the mass of at least one (or all) oxides removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the target metals that are Cu, Ni, Co, Cr, V, Hf, Nb, Mo, Ta, and/or W (both accessible and otherwise) removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) of the accessible target metals that are Cu, Ni, Co, and/or Hf removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the accessible target metals that are Cu, Ni, Co, and/or Hf removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) of the target metals that are Cu, Ni, Co, and/or Hf (both accessible and otherwise) removed from the target-metal-containing material to the mass of at least one (or all) non-target-metal materials removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the target metals that are Cu, Ni, Co, and/or Hf (both accessible and otherwise) removed from the target-metal-containing material to the mass of at least one (or all) non-target-metal materials removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, the ratio of mass of at least one (or all) of the accessible target metals that are Cu, Ni, Co, and/or Hf removed from the target-metal-containing material to the mass of at least one (or all) oxides (e.g., metal oxides and/or metalloid oxides, such as silicon oxides, aluminum oxides, titanium oxides, zirconium oxides, and/or rare earth oxides) removed from the target-metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the accessible target metals that are Cu, Ni, Co, and/or Hf removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible. In some embodiments, the ratio of mass of at least one (or all) of the target metals that are Cu, Ni, Co, and/or Hf (both accessible and otherwise) removed from the target-metal-containing material to the mass of at least one (or all) oxides removed from the metal-containing material is at least 1.1:1, at least 1.2:1, at least 1.3:1, at least 1.4:1, at least 1.5:1, at least 1.75:1, at least 2:1, at least 5:1, at least 10:1, at least 100:1, at least 1000:1, at least 10,000:1, or higher. In some embodiments, the ratio of mass of at least one (or all) of the target metals that are Cu, Ni, Co, and/or Hf (both accessible and otherwise) removed from the target-metal-containing material to the mass of at least one (or all) oxides removed from the target-metal-containing material is up to 100,000:1, up to $10^7$:1, up to $10^9$:1, or higher. Combinations of the above-referenced ranges are possible (e.g., at least 1.1:1 and up to $10^9$:1). Other ranges are also possible.

In some embodiments, a target-metal-containing material may be exposed to a fluid phase comprising molten salt(s) for any suitable amount of time. In some cases, the time may depend upon the type and/or concentration of metals within a target-metal-containing material. In certain embodiments, target metal can be removed from the target-metal-containing material in less than 200 minutes, less than 100 minutes, less than 10 minutes, or less than 5 minutes. In some embodiments, the target-metal-containing material may be exposed to the fluid phase comprising the molten salt(s) for at least 30 seconds, at least 1 minute, at least 5 minutes, or longer. Combinations of these ranges are also possible.

In some embodiments, the presence of a molten Non-I-II Lewis Acid enhances the rate of removal of target metal from the target-metal-containing material, which reduces the time necessary to remove a given amount of target metal from the target-metal-containing material.

In some embodiments, the target-metal-containing material is exposed to the fluid phase in the absence of, or in the presence of a relatively small amount of, a supplemental source of chlorine atoms or other halogen atoms. As used herein, a "supplemental" source of atoms (e.g., chlorine atoms or other halogen atoms) refers to a source of those atoms that is not the molten halogen salt(s). It has been unexpectedly discovered, in the context of the present disclosure, that the halogen atoms within the molten salt can be sufficient to remove metal from metal-containing materials, without the need for other sources of halogen atoms; it was previously expected that such removal would not be achievable without using a supplemental source of halogen atoms (such as chlorine gas). In addition, it has been discovered that the use of no or relatively small amounts of supplemental chlorine atoms or other halogen atoms can reduce the formation of toxic byproducts (e.g., dioxins, furans, and/or other aromatic halocarbons) as a result of the reaction between the supplemental source of chlorine (e.g., chlorine gas) or other halogen atoms and the metal-containing material. For example, the presence of a relatively small amount of (or no) chlorine atoms from a supplemental source may advantageously reduce the formation of toxic byproducts typically observed during chlorination reactions between the chlorine and the metal of the metal-containing material. In particular, the lack or relatively low amount of gaseous materials containing chlorine atoms (e.g., $Cl_2$ or other chlorine-containing gases) or other gaseous materials containing other halogen atoms may reduce or prevent the formation of hazardous decomposition products (e.g., dioxane, furans, and/or other aromatic halocarbons, etc.). The use of halogen salts, as described according to certain embodiments herein, can, in some cases, remove the need for a multi-step metal recovery process (e.g. where various supplemental sources are introduced in separate steps) typically used in traditional metal recovery processes.

In some embodiments, during the exposure of the target-metal-containing material to the fluid phase and/or during the removal of target metal from the target-metal-containing material, the ratio of the number of halogen atoms within the molten halogen salt to the number of chlorine atoms from supplemental $Cl_2$ is at least 3:1, at least 4:1, at least 5:1, at least 10:1, at least 100:1, at least 1,000:1, at least 10,000:1, or at least 100,000:1. In some embodiments, no supplemental $Cl_2$ contacts the fluid phase during the exposure of the target-metal-containing material to the fluid phase and/or during the removal of target metal from the target-metal-containing material.

In some embodiments, during the exposure of the target-metal-containing material to the fluid phase and/or during the removal of target metal from the target-metal-containing material, the ratio of the number of halogen atoms within the molten halogen salt to the number of chlorine atoms from a supplemental chlorine-containing gas is at least 3:1, at least 4:1, at least 5:1, at least 10:1, at least 100:1, at least 1,000:1, at least 10,000:1, or at least 100,000:1. In some embodiments, no supplemental chlorine-containing gas contacts the fluid phase during the exposure of the target-metal-containing material to the fluid phase and/or during the removal of target metal from the target-metal-containing material. As used herein, a "chlorine-containing gas" is a gaseous material that contains chlorine atoms in any form. Examples of chlorine-containing gases include, but are not limited to, gaseous chlorine (i.e., $Cl_2$), $CCl_4$, $COCl_2$, and $SOCl_2$.

In certain embodiments, the ratio of the number of halogen atoms within the molten halogen salt to the number of chlorine atoms from all supplemental sources of Cl (if present) is at least 3:1, at least 4:1, at least 5:1, at least 10:1, at least 100:1, at least 1,000:1, at least 10,000:1, or at least 100,000:1. In some embodiments, no supplemental source of chlorine atoms is present during the exposure of the target-metal-containing material to the fluid phase and/or during the removal of target metal from the target-metal-containing material.

In some embodiments, during the exposure of the target-metal-containing material to the fluid phase and/or during the removal of target metal from the target-metal-containing material, the ratio of the number of halogen atoms within the molten halogen salt to the number of halogen atoms from a supplemental halogen-containing gas is at least 3:1, at least 4:1, at least 5:1, at least 10:1, at least 100:1, at least 1,000:1, at least 10,000:1, or at least 100,000:1. In some embodiments, no supplemental halogen-containing gas contacts the fluid phase during the exposure of the target-metal-containing material to the fluid phase and/or during the removal of target metal from the target-metal-containing material. As used herein, a "halogen-containing gas" is a gaseous material that contains halogen atoms in any form. Examples of halogen-containing gases include, but are not limited to, $Cl_2$, $Br_2$, $CCl_4$, and $F_2$.

In certain embodiments, the ratio of the number of halogen atoms within the molten halogen salt to the number of halogen atoms from all supplemental sources (if present) is at least 3:1, at least 4:1, at least 5:1, at least 10:1, at least 100:1, at least 1,000:1, at least 10,000:1, or at least 100,000:1. In some embodiments, no supplemental source of halogen atoms is present during the exposure of the target-metal-containing material to the fluid phase and/or during the removal of target metal from the target-metal-containing material.

In some embodiments, the methods described herein (e.g., the heating, the removal, the exposing, etc.) are substantially arsenic-free processes. That is, in some embodiments, arsenic (As) is present in an amount of less than 0.1 wt %, less than 0.01 wt %, less than 0.001 wt %, less than 0.0001 wt %, less than 0.00001 wt %, less than 0.000001 wt %, or lower in the system (e.g., in the initial solid salt formulation and/or in the fluid phase, e.g., in molten form).

In some embodiments, after target metal has been removed from the target-metal-containing material, the target metal can be recovered from the fluid phase. For example, in some embodiments in which the target metal within the target-metal-containing material is reacted to form a metal halide, the metal halide can be further processed. In some such embodiments, the non-target-metal material from the target-metal-containing material can be at least partially separated from the target metal(s) of the target-metal-containing material. In some embodiments, the target metal material can be recovered in a form having an oxidation state of 0.

Figure 2A:
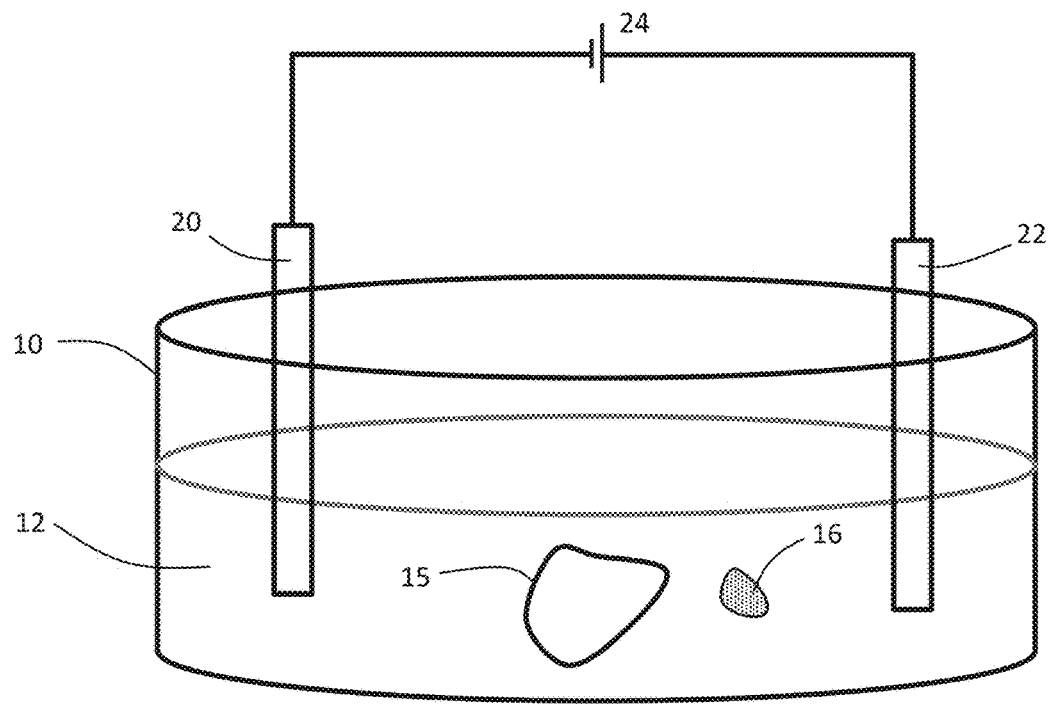
FIGS. 2A-2B are perspective view schematic illustrations showing a method of recovering metal via electroplating, according to some embodiments.
Figure 2B:
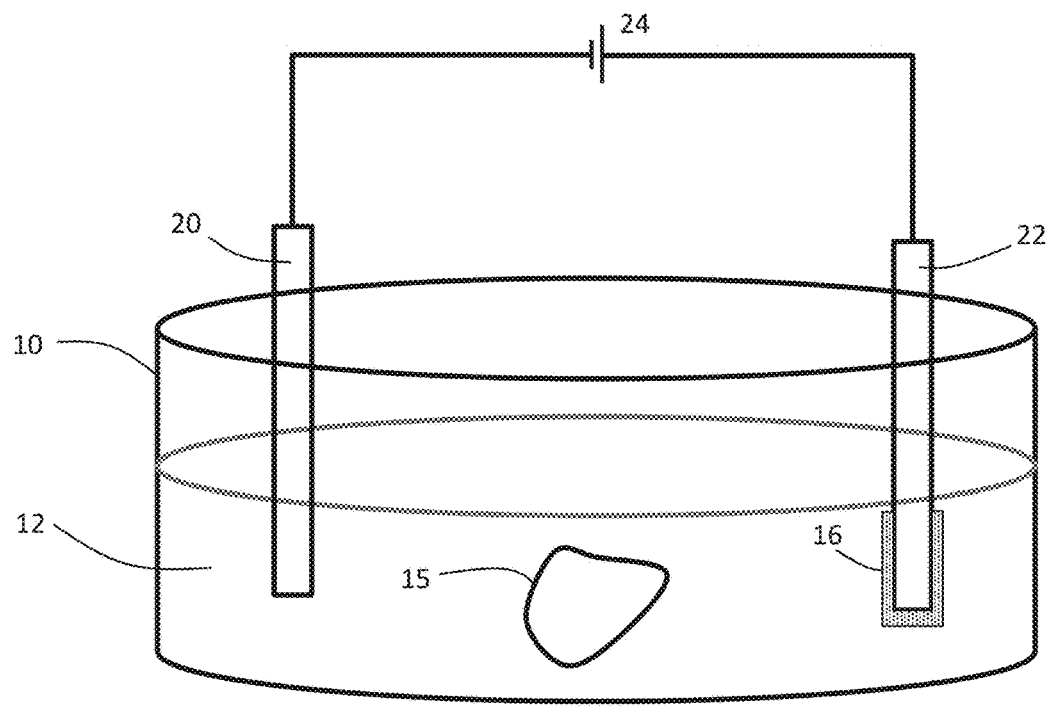

In some embodiments, at least a portion of the target metal removed from the target-metal-containing material can be recovered via electroplating. For example, as shown in FIG. 2A, electrodes 20 and 22 can be inserted into fluid phase 12. An electric potential 24 can be applied across electrodes 20 and 22 such that metal material 16 migrates to and plates on electrode 22, as shown in FIG. 2B. The non-target-metal material can then be recovered separately, in certain embodiments.

Alternatively or additionally, in one set of embodiments, a hydrometallurgical process may be employed to recover target metal from the fluid phase. For example, in some embodiments, the target metal material can be recovered via precipitation, electrowinning, electrolysis, and/or gaseous reduction.

Figure 3A:
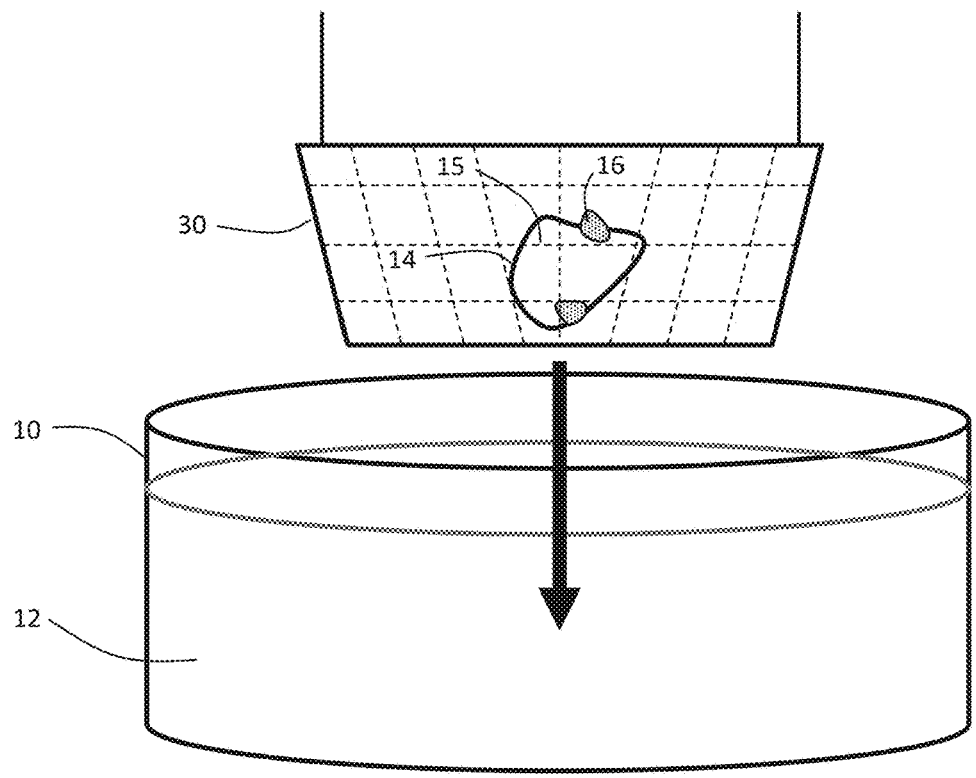
FIGS. 3A-3D are, in accordance with some embodiments, perspective view schematic illustrations showing a method of recovering metal from a target-metal-containing material by submerging an open container into a fluid phase comprising molten salt(s).
Figure 3B:
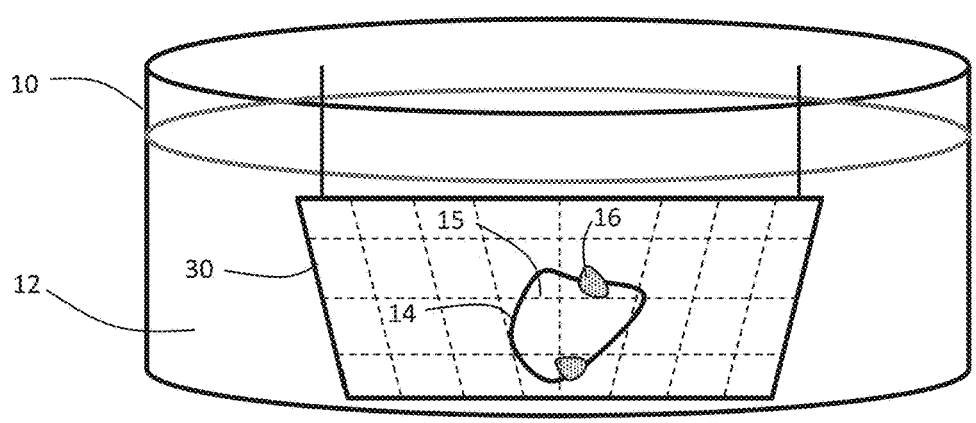
Figure 3C:
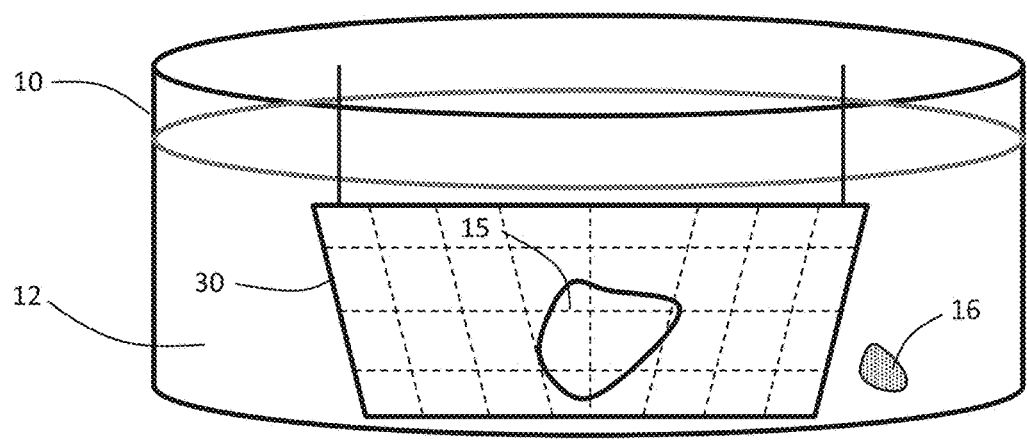
Figure 3D:
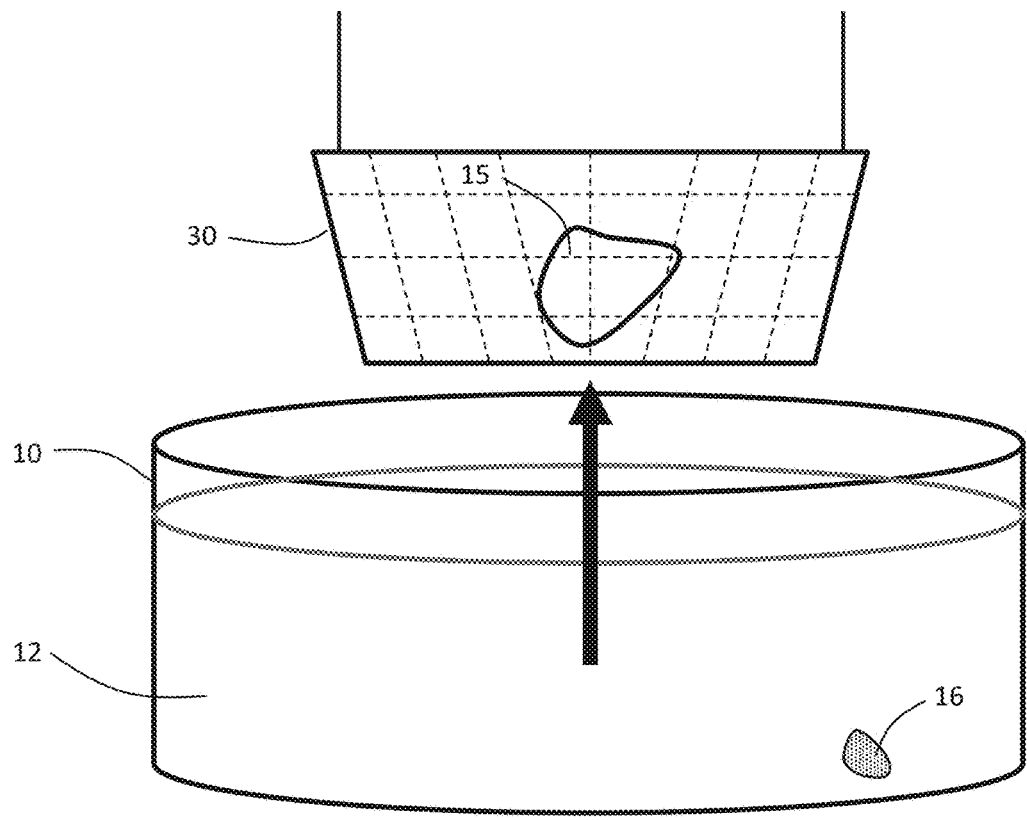

In yet another set of embodiments, the target-metal-containing material can be introduced to the fluid phase using a container that allows the fluid phase to enter the container while retaining non-target-metal material. After the target metal has been removed, the container can be removed from the fluid phase, accompanied by non-target-metal material, and leaving the metal behind in the fluid phase. One example of such a process is shown in FIGS. 3A-3D. In FIGS. 3A-3B, container 30 is lowered into fluid phase 12 such that fluid phase 12 infiltrates container 30. As shown in FIG. 3C, metal 16 is removed from the target-metal-containing material, leaving behind non-target-metal material 15. As shown in FIG. 3D, after target metal 16 has been removed, container 30 is removed from fluid phase 12, accompanied by non-target-metal material 15, leaving target metal 16 behind in fluid phase 12. Container 30 may be made from any material resistant to degradation by the components of the fluid phase. Examples of suitable materials include, but are not limited to, chemically resistant plastics, ceramics, and oxides. In one set of embodiments, container 30 is one of a plurality of containers attached to a conveyor. In some such embodiments, after a first container connected to the conveyor has been immersed in and removed from the fluid phase, the conveyor transports a second container to the fluid phase where it is subsequently immersed into and removed from the fluid phase. One example of such operation is shown in FIG. 4.

Figure 4:
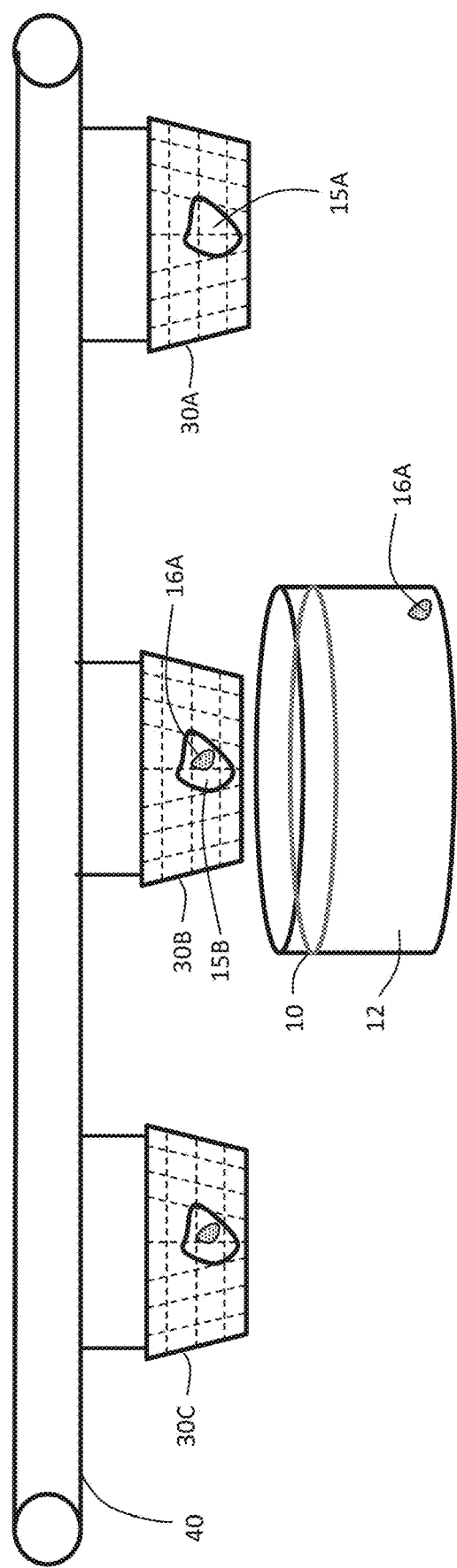
FIG. 4 is, in accordance with certain embodiments, a schematic illustration of a conveyor system for processing multiple containers of metal-containing materials.

In FIG. 4, container 30A was previously immersed into fluid phase 12, leaving behind metal material 16A. Container 30A was then removed from fluid phase 12, taking non-target-metal material 15A with it. Subsequently, conveyor 40 was actuated such that container 30B has been positioned over fluid phase 12. Container 30B may now be submerged in fluid phase 12, such that target metal 16B will be removed from non-target-metal material 15B. After container 30B is immersed into and removed from fluid phase 12, conveyor 40 can be actuated again, and container 30C can be processed.

In certain embodiments, a relatively large percentage of the target metal that is dissolved or otherwise removed from the target-metal-containing material is recovered. In some embodiments, at least 25 wt %, at least 30 wt %, at least 40 wt %, at least 50 wt %, at least 75 wt %, at least 99.9 wt %, or 100 wt % of the removed (e.g., dissolved) target metal from the target-metal-containing material may be recovered.

In some embodiments, a relatively high percentage of the target metal(s) present in the target-metal-containing material may be recovered. In some embodiments, at least 25 wt %, at least 50 wt %, at least 75 wt %, at least 90 wt %, at least 95 wt %, at least 99 wt %, at least 99.9 wt %, or 100 wt % the target metal(s) present in the target-metal-containing material is recovered.

In some embodiments, the target metal that is recovered is relatively pure. For example, in certain embodiments, the recovered solids contain the target metal in an amount of at least 40 wt %, at least 50 wt %, at least 60 wt %, at least 70 wt %, at least 80 wt %, at least 90 wt %, at least 99.5 wt %, at least 99.9 wt %, or 100 wt %.

In some embodiments, a bath for removal and recovery of a metal in a metal-containing material is provided herein. In some such embodiments, a target-metal-containing material may be added directly to an already-formed bath. Advantageously, the use of an already-formed bath may enhance process efficiency and enable a continuous operation of the target metal recovery process.

In some embodiments, the bath comprises a fluid phase comprising at least one molten Non-I-II Lewis Acid Halogen Salt (e.g., any of the Non-I-II Lewis Acid Halogen Salts described above or elsewhere herein). In some embodiments, the bath further comprises at least one molten I-II Halogen Salt (e.g., any of the Non-I-II Lewis Acid Halogen Salts described above or elsewhere herein). The types and ratios of molten salts present in the bath can be any of those described above or elsewhere herein. For example, in some embodiments, the Non-I-II Lewis Acid Halogen Salt(s) may be present in an amount of at least 50 wt %, at least 75 wt %, at least 90 wt %, at least 95 wt %, at least 99 wt %, at least 99.9 wt %, or more, of the bath. In some embodiments, the I-II Halogen Salt(s) may be present in an amount of at least 50 wt %, at least 75 wt %, at least 90 wt %, at least 95 wt %, at least 99 wt %, at least 99.9 wt %, or more of the bath.

In some embodiments, a molten bath comprises a single solid salt material that comprises one or more I-II Elements, one or more Non-I-II Lewis Acids, and one or more halogens. For example, the molten bath may comprise a single solid salt that takes the form of $A_xD_yE_z$, where A is one or more I-II Elements, D is one or more Non-I-II Lewis Acids, and E is one or more halogens. In some embodiments, at least 50 wt %, at least 75 wt %, at least 90 wt %, at least 95 wt %, at least 99 wt %, at least 99.9 wt %, or more of the fluid phase is made up of molten salt of the form $A_xD_yE_z$ described herein.

In certain embodiments, a relatively large percentage of the halogen salts (e.g., any of the single salts or combinations of salts described above) within the fluid phase are molten. In certain embodiments, at least 50 vol %, at least 60 vol %, at least 65 vol %, at least 70 vol %, at least 75 vol %, at least 80 vol %, at least 85 vol %, at least 90 vol %, at least 95 vol %, at least 99 vol %, or all of the halogen salts within the fluid phase are molten. In one set of embodiments, at least 50 vol %, at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, or all of the halogen salts within the fluid phase that are Non-I-II Lewis Acid Halogen Salts are molten. Alternatively or additionally, in one set of embodiments, at least 50 vol %, at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, or all of all I-II Halogen Salts within the fluid phase are molten.

In some embodiments, a relatively large atomic percentage (at %) of the I-II Elements and/or the Non-I-II-Lewis Acid within the salts in the fluid phase are in molten salt form. In some embodiments, greater than or equal to 50 at %, greater than or equal to 60 at %, greater than or equal to 70 at %, greater than or equal to 80 at %, greater than or equal to 90 at %, or all of the I-II Elements in the fluid phase are in molten salt form. In some embodiments, greater than or equal to 50 at %, greater than or equal to 60 at %, greater than or equal to 70 at %, greater than or equal to 80 at %, greater than or equal to 90 at %, or all of Non-I-II Lewis Acids in the fluid phase are in molten salt form. In some embodiments, greater than or equal to 50 at %, greater than or equal to 60 at %, greater than or equal to 70 at %, greater than or equal to 80 at %, greater than or equal to 90 at %, or all of I-II-Elements and Non-I-II Lewis Acids in the fluid phase are in molten salt form.

Additionally, as described elsewhere herein, the fluid phase may comprise a relatively small amount of, if any, supplemental source of chlorine atoms or other halogen atoms. In some embodiments, no supplemental source of chlorine atoms or other halogen atoms (e.g., chlorine-containing gas, halogen-containing gas) is present in the fluid phase.

In some embodiments, the bath may be contained in a vessel (e.g., a reactor or other vessel) that is resistant to degradation (chemical or physical) from the fluid phase. The vessel may be made from any of a variety of suitable materials that are resistant to degradation by molten halogen salts. Non-limiting examples of suitable materials include, but are not limited to, ceramics (e.g., alumina, silica, mullite, ceramics, and the like), chemically resistant polymers (e.g., fluoropolymers, high weight polyethylene, chloropolymers, etc.), and the like.

"Metal elements" are those found in Groups 1-12 of the Periodic Table (except hydrogen (H)); Al, Ga, In, Tl, and Nh in Group 13 of the Periodic Table; Sn, Pb, and Fl in Group 14 of the Periodic Table; Bi and Mc in Group 15 of the Periodic Table; Po and Lv in Group 16 of the Periodic Table; the lanthanides; and the actinides.

The "Group 1 Metal Elements" are lithium (Li), sodium (Na), potassium (K), rubidium (Rb), cesium (Cs), and francium (Fr).

The "Group 2 Metal Elements" are beryllium (Be), magnesium (Mg), calcium (Ca), strontium (Sr), barium (Ba), and radium (Ra).

The "Group 3 Metal Elements" are scandium (Sc), yttrium (Y), lanthanum (La), and actinium (Ac).

The "Group 4 Metal Elements" are titanium (Ti), zirconium (Zr), hafnium (Hf), and rutherfordium (Rf).

The "Group 5 Metal Elements" are vanadium (V), niobium (Nb), tantalum (Ta), and dubnium (Db).

The "Group 6 Metal Elements" are chromium (Cr), molybdenum (Mo), tungsten (W), and seaborgium (Sg).

The "Group 7 Metal Elements" are manganese (Mn), technetium (Tc), rhenium (Re), and bohrium (Bh).

The "Group 8 Metal Elements" are iron (Fe), ruthenium (Ru), osmium (Os), and hassium (Hs).

The "Group 9 Metal Elements" are cobalt (Co), rhodium (Rh), iridium (Ir), and meitnerium (Mt).

The "Group 10 Metal Elements" are nickel (Ni), palladium (Pd), platinum (Pt), and darmstadtium (Ds).

The "Group 11 Metal Elements" are copper (Cu), silver (Ag), gold (Au), and roentgenium (Rg).

The "Group 12 Metal Elements" are zinc (Zn), cadmium (Cd), mercury (Hg), and copernicium (Cn).

The "Group 13 Metal Elements" are aluminum (Al), gallium (Ga), indium (In), thallium (Tl), and nihonium (Nh).

The "Group 14 Metal Elements" are tin (Sn), lead (Pb), and flerovium (Fl).

The "Group 15 Metal Elements" are bismuth (Bi) and moscovium (Mc).

The "Group 16 Metal Elements" are polonium (Po) and livermorium (Lv).

The "metalloid elements" are boron (B), silicon (Si), arsenic (As), germanium (Ge), antimony (Sb), tellurium (Te), and astatine (At).

The following examples are intended to illustrate certain embodiments of the present invention, but do not exemplify the full scope of the invention.

EXAMPLE 1

This example describes the removal and recovery of platinum (the target metal) from mining tailings using molten salt comprising sodium chloride, potassium chloride, and zinc chloride.

A salt material composed of 3.68 grams sodium chloride, 5.34 grams potassium chloride, and 11.98 grams zinc chloride was heated to 215° C. over a period of 30 minutes, melted to form a molten salt, and mixed at the 30 minute mark. Afterwards, 0.5 grams of tailings were added, mixed, and the system was allowed to settle. The tailings bulk composition was 90 wt % silica, 10 wt % alumina, bearing the addition of 1 g/metric ton of platinum sulfide. The mix was allowed to sit for 6 hours. High platinum recovery was obtained. The silica and alumina were not substantially dissolved.

EXAMPLE 2

This example describes the removal and recovery of platinum (the target metal) from mining tailings using molten salt comprising sodium chloride, potassium chloride, and copper (II) chloride.

A salt material composed of 4.86 grams sodium chloride, 6.20 grams potassium chloride, and 9.94 grams copper (II) chloride was heated to 190° C. over a period of 30 minutes, melted to form a molten salt, and mixed at the 30 minute mark. Afterwards, 0.5 grams of tailings were added, mixed, and the system was allowed to settle. The tailings bulk composition was 90 wt % silica, 10 wt % alumina, bearing the addition of 1 g/metric ton of platinum sulfide. The mix was allowed to sit for 6 hours. High platinum recovery was obtained. The silica and alumina were not substantially dissolved.

EXAMPLE 3

This example describes the removal and recovery of platinum (the target metal) from mining tailings using molten salt comprising sodium chloride, potassium chloride, and copper (II) chloride.

A salt material composed of 3.05 grams sodium chloride, 3.90 grams potassium chloride, and 14.05 grams copper (II) chloride was heated to 190° C. over a period of 30 minutes and mixed at the 30 minute mark. Afterwards, 0.5 grams of tailings were added, mixed, and the system was allowed to settle. The tailings bulk composition was 90 wt % silica, 10 wt % alumina, bearing the addition of 1 g/metric ton of platinum sulfide. The mix was allowed to sit for 6 hours. High platinum recovery was obtained. The silica and alumina were not substantially dissolved.

EXAMPLE 4

This example describes the removal and recovery of platinum (the target metal) from mining tailings using molten salt comprising sodium chloride, potassium chloride, and iron (III) chloride.

A salt material composed of 6.73 grams sodium chloride, 3.96 grams potassium chloride, and 10.30 grams iron (III) chloride was heated to 190° C. over a period of 30 minutes and mixed at the 30 minute mark. Afterwards, 0.5 grams of tailings were added, mixed, and the system was allowed to settle. The tailings bulk composition was 90 wt % silica, 10 wt % alumina, bearing the addition of 1 g/metric ton of platinum sulfide. The mix was allowed to sit for 6 hours. High platinum recovery was obtained. The silica and alumina were not substantially dissolved.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage, "at %" is an abbreviation of atomic percentage, and "vol %" is an abbreviation of volume percentage.

Use of ordinal terms such as "first," "second," "third," etc., in the claims to modify a claim element does not by itself connote any priority, precedence, or order of one claim element over another, but is employed merely as a way to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    heating a solid salt material comprising an alkali metal and/or an alkaline earth metal, a Lewis acid that is not an alkali metal and is not an alkaline earth metal, a first halogen, and a second halogen such that at least a portion of the solid salt material melts to form a molten salt material comprising at least some of the alkali metal and/or alkaline earth metal, at least some of the Lewis acid that is not an alkali metal and is not an alkaline earth metal, at least some of the first halogen, and at least some of the second halogen; and
    adding a target-metal-containing material comprising platinum as a target metal and at least one oxide to the molten salt material such that at least a portion of the platinum target metal is removed from the target-metal-containing-material, and a ratio of the mass of accessible platinum target metal that is removed from the target-metal-containing material to the mass of oxide(s) removed from the target-metal-containing material is at least 2:1,
    wherein:
        the Lewis acid that is not an alkali metal and is not an alkaline earth metal comprises a transition metal cation;
        during at least a portion of the exposure of the target-metal-containing material to the molten salt material, a ratio of halogen atoms within the molten salt material to chlorine atoms from supplemental chlorine-containing gas is at least 3:1;
        during at least a portion of the exposure of the target-metal-containing material to the molten salt material, the first halogen is present in an amount of at least 0.1 wt % of the molten salt material; and
        during at least a portion of the exposure of the target-metal-containing material to the molten salt material, the second halogen is present in an amount of at least 0.1 wt % of the molten salt material.

2. The method of claim 1, wherein an atomic ratio of an amount of the Lewis acid that is not an alkali metal and is not an alkaline earth metal to an amount of the alkali metal and/or the alkaline earth metal is at least 1:1.

3. The method of claim 1, wherein the platinum target metal has an oxidation state of greater than or equal to +2.

4. The method of claim 1, wherein the molten salt material comprises two or more metals selected from the group of alkali metals and/or alkaline earth metals.

5. The method of claim 1, wherein the first halogen comprises Br and/or F and the second halogen comprises Cl.

6. The method of claim 1, wherein:
    the molten salt material is part of a fluid phase; and
    at least 50 vol % of all halogen salts within the fluid phase that comprise a Lewis acid that is not an alkali metal and is not an alkaline earth metal are molten.

7. The method of claim 1, wherein the transition metal cation has an oxidation state of greater than +1.

8. The method of claim 1, wherein the Lewis acid that is not an alkali metal and is not an alkaline earth metal is present in an amount of greater than or equal to 35 wt % in the solid salt material.

9. The method of claim 1, wherein the alkali metal and/or alkaline earth metal is present in an amount of greater than or equal to 30 wt % of the molten salt material.

10. The method of claim 1, wherein the heating comprises heating the solid salt material to a temperature of greater than or equal to 100° C. and less than or equal to 700° C.

11. The method of claim 1, wherein the heating comprises heating the solid salt material such that at least 50 at % of the alkali metal and/or alkaline earth metal is part of the molten salt material and at least 50 at % of the Lewis acid that is not an alkali metal and is not an alkaline earth metal is part of the molten salt material.

12. The method of claim 1, wherein the at least one oxide comprises a silicon oxide, an aluminum oxide, and/or a titanium oxide.

13. The method of claim 1, wherein the target-metal-containing material comprises scrap metal, mining tailings, mineral ores, and/or dust particles.

14. The method of claim 1, wherein the target-metal-containing-material further comprises a second transition metal as a target metal.

15. The method of claim 1, wherein the target-metal-containing-material further comprises a second noble metal as a target metal.

16. The method of claim 1, wherein at least 25 wt % of the platinum target metal is removed from the target-metal-containing material.

17. The method of claim 1, wherein no supplemental source of chlorine atoms is present during the removal of the platinum target metal from the target-metal-containing material.

18. The method of claim 1, wherein no supplemental source of halogen atoms is present during the removal of the platinum target metal from the target-metal-containing material.

19. The method of claim 1, further comprising reacting a portion of the platinum target metal in the target-metal-containing-material with a molten halogen to form a platinum halide.

20. The method of claim 1, wherein the first halogen comprises Cl and/or F.

21. The method of claim 1, wherein the molten salt material comprises molten NaCl and/or molten KCl.

22. The method of claim 1, wherein the molten salt material comprises molten $FeCl_3$.

23. The method of claim 1, wherein the platinum target metal has an oxidation state of 0.

24. The method of claim 1, wherein the ratio of the mass of accessible platinum target metal that is removed from the target-metal-containing material to the mass of oxide(s) removed from the target-metal-containing material is at least 100:1.

25. The method of claim 1, wherein the ratio of the mass of accessible platinum target metal that is removed from the target-metal-containing material to the mass of oxide(s) removed from the target-metal-containing material is at least 10,000:1.

26. The method of claim 1, wherein during at least a portion of the exposure of the target-metal-containing material to the molten salt material, a ratio of halogen atoms within the molten salt material to chlorine atoms from supplemental chlorine-containing gas is at least 100:1.

27. The method of claim 1, wherein during at least a portion of the exposure of the target-metal-containing material to the molten salt material, a ratio of halogen atoms within the molten salt material to chlorine atoms from supplemental chlorine-containing gas is at least 10,000:1.

28. The method of claim 1, wherein:
during at least a portion of the exposure of the target-metal-containing material to the molten salt material, the first halogen is present in an amount of at least 1 wt % of the molten salt material; and
during at least a portion of the exposure of the target-metal-containing material to the molten salt material, the second halogen is present in an amount of at least 1 wt % of the molten salt material.

29. The method of claim 1, wherein:
during at least a portion of the exposure of the target-metal-containing material to the molten salt material, the first halogen is present in an amount of at least 5 wt % of the molten salt material; and
during at least a portion of the exposure of the target-metal-containing material to the molten salt material, the second halogen is present in an amount of at least 5 wt % of the molten salt material.

* * * * *